(12) United States Patent
Ivanovic-Burmazovic et al.

(10) Patent No.: US 8,986,638 B2
(45) Date of Patent: Mar. 24, 2015

(54) CATALYTIC OXIDATION OF SULPHIDE SPECIES

(75) Inventors: Ivana Ivanovic-Burmazovic, Weiher (DE); Milos Filipovic, Nuremberg (DE)

(73) Assignee: Friedrich-Alexander-Universitaet Erlanden-Nuernberg, Erlangen (DE)

( * ) Notice: Subject to any disclaimer, the term of this patent is extended or adjusted under 35 U.S.C. 154(b) by 0 days.

(21) Appl. No.: 14/128,070

(22) PCT Filed: Jun. 21, 2012

(86) PCT No.: PCT/EP2012/062005
§ 371 (c)(1),
(2), (4) Date: Jan. 27, 2014

(87) PCT Pub. No.: WO2012/175630
PCT Pub. Date: Dec. 27, 2012

(65) Prior Publication Data
US 2014/0140912 A1     May 22, 2014

(30) Foreign Application Priority Data

Jun. 21, 2011    (EP) .................................. 11170667

(51) Int. Cl.
*B01D 53/52*      (2006.01)
*C01B 17/64*      (2006.01)
(Continued)

(52) U.S. Cl.
CPC ............ *B01D 53/52* (2013.01); *B01D 53/8612* (2013.01); *C01B 17/05* (2013.01); *C02F 1/725* (2013.01); *C10G 27/10* (2013.01); *C02F 2101/101* (2013.01); *B01D 2255/2073* (2013.01); *B01D 2255/20738* (2013.01);
(Continued)

(58) Field of Classification Search
USPC .......... 423/573.1, 576.4, 576.5, 576.6, 576.7, 423/576.8, 220; 210/763
See application file for complete search history.

(56) References Cited

U.S. PATENT DOCUMENTS 4,468,929 A * 9/1984 Jernigan .................... 423/573.1
5,212,134 A     5/1993 Kochetkova et al.
(Continued)

OTHER PUBLICATIONS

Goifman A et al., "Pyrolysed carbon supported cobalt porphyrin: a potent catalyst for oxidation of hydrogen sulfide", Applied Catalysis B: Environmental Elsevier, vol. 54, No. 4, Dec. 30, 2004, pp. 225-235.

*Primary Examiner* — Timothy Vanoy
(74) *Attorney, Agent, or Firm* — Ann Wieczorek; Mayer & Williams PC

(57) ABSTRACT

The present invention relates to a process for the catalytic oxidation of sulphide, mono- and/or dihydrogen sulphide, comprising the step of
contacting the sulphide, mono- and/or dihydrogen sulphide in the presence of oxygen with a chelate complex comprising
(i) a metal cation selected from the group consisting of $Fe^{z+}$, $Mn^{z+}$, $Ni^{z+}$ and $Co^{z+}$, where z=2 or 3, and
(ii) a chelate ligand containing a porphyrin, a phthalocyanine or a porphyrazine ring coordinated to the metal cation, and at least one cationic substituent covalently attached to the ring in the chelate ligand.

14 Claims, 23 Drawing Sheets

(51) Int. Cl.
*C02F 1/72* (2006.01)
*B01D 53/86* (2006.01)
*C01B 17/05* (2006.01)
*C10G 27/10* (2006.01)
*B01J 31/16* (2006.01)
*B01J 31/18* (2006.01)
*B01J 31/22* (2006.01)
*C02F 101/10* (2006.01)

(52) U.S. Cl.
CPC ........... *B01D2255/20746* (2013.01); *B01D 2255/20753* (2013.01); *B01D 2255/705* (2013.01); *B01D 2256/24* (2013.01); *B01D 2257/304* (2013.01); *B01D 2258/025* (2013.01); *B01D 2258/0283* (2013.01); *B01D 2258/05* (2013.01); *C10G 2300/207* (2013.01); *B01J 2540/54* (2013.01); *B01J 31/1616* (2013.01); *B01J 31/165* (2013.01); *B01J 31/1815* (2013.01); *B01J 31/2243* (2013.01); *B01J 2231/70* (2013.01); *B01J 2531/025* (2013.01); *B01J 2531/0252* (2013.01); *B01J 2531/842* (2013.01); *B01J 2531/845* (2013.01); *B01J 2531/847* (2013.01); *B01J 2540/42* (2013.01); *B01J 2540/64* (2013.01)
USPC ............ 423/220; 423/576.7; 423/573.1; 423/576.4; 423/576.5; 423/576.6; 423/576.8; 210/763

(56) References Cited

U.S. PATENT DOCUMENTS

| | | | |
|---|---|---|---|
| 5,494,587 A | | 2/1996 | Morlec et al. |
| 6,165,436 A | * | 12/2000 | Dezael et al. ............. 423/576.4 |
| 6,596,253 B1 | * | 7/2003 | Barrere-Tricca et al. .. 423/573.1 |

* cited by examiner

CATALYTIC OXIDATION OF SULPHIDE SPECIES

CROSS REFERENCE TO RELATED APPLICATION

This application is a 371 National Phase in the United States of International Application No. PCT/EP2012/062005, filed Jun. 21, 2012, which claims priority to European Application No. 11170667.7, filed Jun. 21, 2011, which are incorporated herein by reference.

This invention is concerned with a process for the catalytic oxidation of sulphides, mono- and/or dihydrogen sulphides, i.e. sulphur compounds containing sulphur in an oxidation state of (−2), in particular $H_2S$, $HS^-$ and $S^{2-}$, using specific metal chelate complexes comprising one or more cationic group(s) as catalysts. The process can be advantageously used to convert these sulphides which may be contained as pollutants in liquid and gaseous media into oxidized forms which can be collected and/or removed.

Hydrogen sulphide is a highly toxic and corrosive environmental pollutant with an obnoxious smell which needs to be removed for pollution control as well as process requirements in industries. Natural gas processing complexes, refineries, oil companies, sulphur processing chemical industries, pharmaceutical industries, sugar industries, sewage treatment plants and bio-gas generating units are some of the major industries in need of an economical viable solution for $H_2S$ removal.

The content of $H_2S$ in these gas flows can slightly vary, but oscillates generally between 0,005% up to 10% in volume. Pollution by hydrogen sulphide is a well known problem in the industry because of its toxicity, and because of the corrosion problems that can occur in plants in case it is not removed from the gas. For this reason, the maximum admissible operative concentration of $H_2S$ in an industrial flow is 1000 ppm, while the maximum concentration of $H_2S$ in a gas flow released in the environment is 5 ppm.

The most commonly used technique for the desulphurization of gas emissions is based on the Claus reaction between hydrogen sulphide and oxygen to form sulphur dioxide and water:

$$H_2S + 3/2 O_2 \rightarrow H_2O + SO_2$$

$$SO_2 + H_2S \rightarrow 2 H_2O + 3 S$$

However, this technology requires large investments, and it cannot be directly applied to the treatment of natural gas. Moreover, it is usually not used with gas emitters that have sulphur quantities less than 15 tons/day. The main problem with the Claus process is that due to thermodynamic limitations not all of $H_2S$ can be removed this way and the gas exiting the reactor is still rich in sulphurated species which require additional purification processes. Also, in a thermal step of this process, temperatures even above 850° C. are required, which causes high energy costs.

In nature, the $Fe^{3+}/Fe^{2+}$ redox couple has served for ages to facilitate the oxidation of $H_2S$ to S by air in volcanic and geothermally active areas. However, the industrial use of $Fe^{3+}$ as a regenerable oxidant for gas stream $H_2S$ desulphurization only commenced in 19$^{th}$ century with the introduction of $Fe_2O_3$.

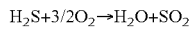

$Fe_2O_3$ had to be then regenerated by exposing $Fe_2S_3$ to air:

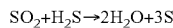

Iron based technology further evolved through hexacyanoferrate based processes to current, aqueous, homogenous redox catalyst employing amino and polyamino polycarboxylate chelated iron (FeL; where, for example, L=NTA, EDTA, CDTA or HEDTA). These processes generally require additional efforts for the re-oxygenation of formed iron 2+ in an oxidizing vessel. Metal complexes with amino and polyamino polycarboxylate chelates utilised for removal of $H_2S$ are described, for example, in: U.S. Pat. No. 5,292,440; Martell, A. E et al., *Can. J. Chem.* 1996, 74 (10), 1872-1879; McManus, D. et al., *J. Mol. Catal. A* 1997, 117 (1-3), 289-297; Piche, S. et al., *Environ. Sci. Technol.* 2007, 41 (4), 1206-1211. One main problem associated with the use of these chelates is their oxidative degradation, which requires continuous addition of considerable quantities of costly chelate agents. Additionally, the required concentrations of those amino and polyamino polycarboxylate chelated iron catalysts are relatively high and the reported turn over numbers (TON) are not very high (e.g. for Fe(EDTA), a TON of ca. 200 has been reported; see: Harrup, M. K. and Hill, C. L., *Inorg. Chem.* 1994, 33, 5448-5455). Moreover, the rates of conversion of sulphide species are very slow, e.g. concentrations of Fe(CDTA) lower than 150 μM are inadequate to convert ca. 80 μM solution of $HS^-$ in a reasonable time although the purported catalyst is present in excess over $HS^-$. For comparison a half-life of 80 μM $HS^-$ was 24.8 min in the presence of 200 μM Fe(CDTA) (see: Piche, S. et al., *Environ. Sci. Technol.* 2007, 41 (4), 1206-1211).

Although these processes offer possibility to use higher amounts of metal compounds, since they are relatively cheap, the need for additional equipment for re-oxidation and constant re-activation of the catalyst makes the process additionally costly and complex.

U.S. Pat. No. 6,531,103 B1 discloses the use of metal porphyrin and metal phthalocyanine complexes for the removal of sulphide species from liquid or gas feed streams. However, the disclosed process does not involve chemical transformation of sulphur species in the course of the overall process and is not catalytic. It uses binding of sulphite species to stoichiometric amounts of a metal centre and its subsequent dissociation from a metal centre in chemically unchanged form. US 2010/0300938 A1 relates the oxidation of sulphur species in hydrocarbon mixtures using a catalyst showing a cage structure, including certain porphyrin complexes. Chen, S.-M- and Chiu, S.-W., *J. Mol. Cat. A,* 2001, 166, 243-253 use positively charged Co, Fe and Mn porphyrin complexes with TMPyP ligand (predominantly Co(4-TMPyP)) but only for the oxidation of $S_2O_3^{2-}$ and polysulfide ions ($S_x^{2-}$ where x=2, 3, 4; predominantly $S_4^{2-}$) and not for the oxidation of $H_2S/HS^-/S^{2-}$ species. As drawbacks, the reported processes occur at high pH values and also the catalyzed reactions proceeds relatively slowly over several hours. The initial oxidation of $H_2S/HS^-/S^{2-}$ to $S_2O_3^{2-}$ is performed in the absence of any catalyst.

The present invention provides a process for the catalytic oxidation of a sulphide, mono- and/or dihydrogen sulphide (i.e. $H_2S$, $HS^-$ and/or $S^{2-}$), comprising the step of: contacting the sulphide, mono- and/or dihydrogen sulphide in the presence of oxygen with a chelate complex comprising
(i) a metal cation selected from the group consisting of $Fe^{z+}$, $Mn^{z+}$, $Co^{z+}$ and $Ni^{z+}$ where z is 2 or 3 and
(ii) a chelate ligand containing a porphyrin ring, a phthalocyanine ring or a porphyrazine ring which is coordinated to the metal cation, and at least one cationic substituent which is covalently attached to the ring in the chelate ligand.

Moreover, the invention relates in a second aspect to a process for the removal of sulphide, mono- and/or dihydrogen sulphide from a liquid or gaseous medium, comprising the oxidation process according to aspect described above.

The processes in accordance with the invention allows the effective oxidation of sulphide and/or mono- and dihydrogen sulphide using the chelate complexes as catalysts in concentrations as low as in the µM range, as opposed to oxidation processes in the prior art, such as the Fe chelates used in U.S. Pat. No. 5,292,440 which are used in the mM range. Moreover, the catalytic oxidation of the sulphide and/or mono- and dihydrogen sulphide proceeds quickly such that e.g. a half-life of HS$^-$ below 1 min can be achieved at room temperature (ca. 20° C.) for 50 µM HS$^-$ with concentrations of the catalysts as low as ca. 5 µM, or for 200 µM HS$^-$ with concentrations of the catalysts of ca. 20 µM.

In accordance with the invention, the metal chelate complexes with a chelate ligand containing a porphyrin, a phthalocyanine or a porphyrazine ring which is coordinated to the metal cation and which carries a cationic substituent are introduced as efficient catalysts for the oxidation of sulphide species. These complexes act as true catalysts with catalytic properties staying unchanged after the oxidation of a sulphide or hydrogen sulphide. They do not require additional re-oxygenation, since they are re-oxygenated during the catalytic cycle by simply utilizing oxygen available in the surrounding medium.

The rate of the spontaneous oxidation of the above sulphide species with oxygen is generally low, and drastically decreases with the decrease of the concentration of the sulphide and/or mono- and dihydrogen sulphide. This renders particularly the removal of small amounts of these sulphide species very difficult. Exactly under such conditions the cationic group containing metal chelates used in the process in accordance with the invention show their advantages, since they are able to completely remove the sulphide species within minutes when applied at very low concentrations.

The form of application can be adapted to the needs, i.e. the metal chelates can be used for the removal of sulphide species from liquids and gases, in a homogeneous (e.g. dissolved in liquids, dissolved as a part of appropriate supramolecular structures, for example dendrimeric structures, micellar structures, nano-structures) and/or heterogeneous (applied on different support or carrier surfaces such as meshes or particles, at interfaces etc.) form. This is possible since the chelate ligands used in the context of the present invention additionally offer versatile options for functionalisation.

For example in the oxidation of sulphide species in aqueous solutions, the porphyrin complexes with cationic groups in the chelate ligand illustrated as structural examples in FIG. 1 can be conveniently used because they are water soluble. In the case of the iron complexes with the charge on the chelate ligand of +4, turnover numbers (TON) higher than 1000 and a turnover frequency (TOF) of ca. 0.33 s$^{-1}$ was observed. In the case of porphyrins with a higher positive charge in the chelate ligand (e.g. FeP8+ in FIG. 1), the catalytic activity increases even more, which allows an adaptation of the structure according to the particular needs. Importantly, in the case of porphyrins with negatively charged substituents on the chelate ligand (e.g. FeP8– and MP'4– in FIG. 1) or substituents with no charge no catalytic activity was observed. This effect of the charge of substituents at the chelate ligands on the catalytic activity of the complexes is illustrated in FIG. 2 by examples on iron and manganese chelate complexes.

After the oxidation process is completed, the former sulphide species can be removed from a liquid or gaseous medium. For example, in a suitable liquid medium, in particular in water, the removal can be tuned by changing of the solution pH. The formation of elemental sulphur, which can be collected and removed, is greatly facilitated at pH values of 6 and below. The catalytic oxidation can be performed at such pH values from the beginning, or it can be performed at higher pH values and after the oxidation is completed the pH values of the solutions can be adjusted so that the elemental sulphur is, preferably quantitatively, achieved. The elemental sulphur can be removed e.g. by allowing it to precipitate. If preferred, the oxidation product can stay dissolved in the liquid phase, predominantly in the form of thiosulfate ($S_2O_3^{2-}$), by performing the process at pH values of 7 and above, which can be interesting for example in the case when catalyst is immobilized on a support and the gas phase containing sulphide species is bubbled through a liquid phase, where the oxidation product can be accumulated, and which can be replaced by a fresh solution when desired.

As set out above, the present invention provides, according to a first aspect, a process for the catalytic oxidation of a sulphide, mono- and/or dihydrogen sulphide, comprising the step of contacting the sulphide, mono- and/or dihydrogen sulphide in the presence of oxygen with a chelate complex comprising
(i) a metal cation selected from the group consisting of Fe$^{z+}$, Mn$^{z+}$, Ni$^{z+}$ and Co$^{z+}$, where z is 2 or 3 and
(ii) a chelate ligand containing a porphyrin, a phthalocyanine or a porphyrazine ring which is coordinated to the metal cation, and a cationic substituent which is covalently attached to the ring in the chelate ligand.

The substrate to be catalytically oxidized is a sulphide, mono- and/or dihydrogen sulphide. The sulphide, mono- and/or dihydrogen sulphide is more specifically selected from $H_2S$, HS$^-$ and S$^{2-}$ as well as mixtures of two or all of these. In this specification, the generic term "sulphide species" is used to refer to any one of $H_2S$, HS$^-$ or S$^{2-}$, or to any mixtures thereof. It will be understood that $H_2S$ can exist both in liquid media and in gaseous media, and can in fact form a gaseous medium itself. Aqueous solutions of $H_2S$ can contain mixtures of $H_2S$, HS$^-$ and S$^{2-}$ in an equilibrium which is determined by the pH of the solution. The ionic species HS$^-$ or S$^{2-}$ are generally found dissolved in liquid media, especially polar liquids such as aqueous solutions. They will be accompanied by any suitable cation, typically protons, metal cations such as alkali or alkaline earth metal cations, or ammonium cations.

As indicated above, such sulphide species can be present as undesirable pollutants in a variety of liquid and gaseous media, such as water, refinery process streams, natural gas, biogas (typically gas obtained from the fermentation of biomass) and various exhaust gases.

In accordance with the process of the present invention, these sulphide species are oxidized using oxygen which acts as an oxidant. The most generally available and generally used form of oxygen is molecular oxygen, $O_2$. It is possible and for economic reasons preferred to use the oxygen present in air in the process described herein, i.e. it is generally sufficient to contact the sulphide species with the chelate complex in the presence of air. Where the contact between the chelate complex, the sulfide species and oxygen takes place in a liquid medium, such as water, aqueous solutions or mixtures of water with any other solvent (organic solvent, ionic liquids), it is generally sufficient to allow contact of the liquid medium with air. For example, the amount of air which dissolves in the water/aqueous solution is sufficient to let the catalytic reaction proceed efficiently. It will be understood that air can be bubbled through a liquid medium or the liquid medium can be stirred to increase the amount of oxygen, if necessary.

Nevertheless, if considered useful or desirable for specific applications, it is of course possible to increase the amount of oxygen in the reaction system by using $O_2$ gas instead of air.

Although oxygen is referred to as oxidant herein, it should be understood that a direct reaction between the sulphide species and the oxygen does not need to take place in the catalytic oxidation process of the present invention. Without wishing to be bound by theory, it is considered likely that electrons are transferred in the oxidation process from the sulphide species via the metal of the chelate complex to the oxygen. The catalytic activity of these metal chelate complexes likely results from the fact that both the sulphide species and oxygen can coordinate to the metal centre, enabling very efficient, almost simultaneous inner-sphere electron transfer reaction from coordinated sulphide species to metal centre and immediately further from metal centre to already bound oxygen species. In that respect, the role of the positively charged groups on the chelate ligands can be understood in terms of facilitating the binding of the nucleophilic sulphide and/or mono- and dihydrogen sulphide species to the redox active metal centre.

As a result of the oxidation, the oxidation number of the sulphide species increases from –2 to 0 or to positive values. For example, elemental sulphur is obtained particularly if the oxidation process is carried out in slightly acidic water or aqueous solutions, e.g. in a pH range of 6 and below, e.g. 6 to 3. At pH values of 7 and above, such as 7 to 10, thiosulphate ($S_2O_3^{2-}$) ions are formed in water or aqueous solutions. At pH values between pH 6 and 7 a mixture of thiosulphate and elemental sulphur is obtained. Upon acidification of such solutions to pH values lower than 6, elemental sulphur can precipitate.

The process according to the invention is a true catalytic process, i.e. the sulphide species and oxygen are consumed, while the metal chelate is not affected by the reaction. Due to the very fast electron transfer from sulphide species to the metal centre and from metal centre further to oxygen, the initial reduction of the metal centre (e.g. in the case of $Fe^{3+}$ and $Mn^{3+}$ complexes) can not be observed during the catalytic process, although the reduced form of the metal complex, e.g. the $M^{2+}$ form, may be formed as an intermediate species. When the $M^{2+}$ form is the initial form of the applied catalyst (as in the case of $Ni^{2+}$ and $Co^{2+}$ catalysts), a corresponding oxidized $M^{3+}$ form is an intermediate species along the catalytic cycle. Thus, the catalytic mechanism involves alternation of the metal redox state, regardless the initial oxidation state of the used catalysts.

The metal cation is selected from the group consisting of $Fe^{z+}$, $Co^{z+}$, $Ni^{z+}$ and $Mn^{z+}$, where z is 2 or 3. Preferably, it is selected from $Fe^{3+}$, $Mn^{3+}$, $Co^{2+}$ and $Ni^{2+}$, and most preferably $Fe^{3+}$ is used as a metal cation for the chelate complexes in the context of the invention. Generally, the chelate complexes contain one single metal atom per one chelating ring which acts as the coordinative center.

In the chelate complex used as a catalyst in the oxidation process in accordance with the present invention, a ligand containing a porphyrin, phthalocyanine or porphyrazine ring is coordinated to the metal cations referred to above. These ring structures are collectively referred to herein as tetrapyrrole rings.

Porphyrin, phthalocyanine or porphyrazine rings are known as chelating ligands for metal cations. Their structures are illustrated in the following, with formula (1) showing a porphyrine ring, formula (2) showing a phthalocyanine ring and formula (3) showing a porphyrazine ring. Generally preferred are chelate complexes containing a porphyrin ring, as it is illustrated in formula (1).

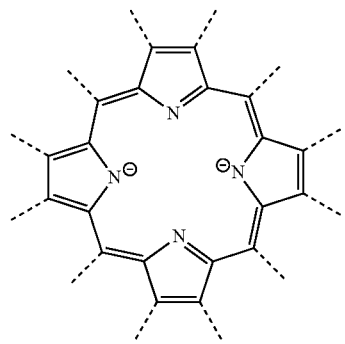

Formula (1)

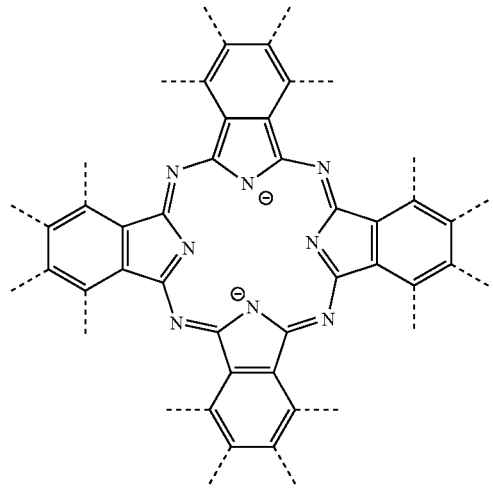

Formula (2)

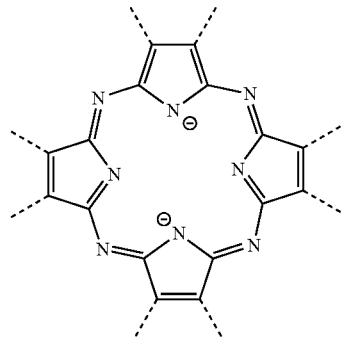

Formula (3)

It will be understood that any reference to a porphyrin, phthalocyanine or porphyrazine ring herein, unless indicated to the contrary, means the di-anionic form of the ring which is capable of forming a chelate ligand with four coordination sites, as it is obtainable by the removal of the two hydrogen atom moieties (as protons) linked to the N-atoms in two pyrrole rings of the parent compounds.

The tetrapyrrole rings which are comprised in the chelate complexes used in accordance with the invention contain carbon atoms which have a free valence that does not link the carbon atom to a neighbouring ring atom in the tetrapyrrole ring. These carbon atoms can form a covalent bond either to a hydrogen atom, or optionally to any other group or atom as a substituent. The free valences to bind a hydrogen atom or a substituent are schematically indicated in formulae (1) to (3) by the dashed lines (----). It will be understood that the type of substituent attached to these positions can be freely chosen with little restrictions. However, it is important in the context of the present invention that at least one cationic substituent is covalently attached to the ring of the chelate ligand, i.e. generally to one of the carbon atoms having a free valence. Thus, the chelate ligand comprised in the chelate complex contains at least one cationic group covalently bound in the chelate ligand.

Examples of optional substituents other than the cationic substituent(s) which may optionally be attached to the carbon atoms of the rings besides hydrogen are halogen, —CN, —OH, —$NH_2$, —$N_3$, —$PH_2$, —$NO_2$, —$SO_2NH_2$, or any other group formed of heteroatoms or of heteroatoms and hydrogen atoms, or a hydrocarbon group which optionally contain one or more heteroatoms. Preferred as hydrocarbon groups are hydrocarbon groups with total number of 1 to 30 carbon atoms. Preferred are 0 to 6 heteroatoms in the hydrocarbon groups. More preferred as optional substituents other than the cationic substituent(s) covalently attached to the ring are hydrogen atoms and/or hydrocarbon groups having 1 to 12 carbon atoms and optionally containing 0, 1, 2 or 3 heteroatom(s).

The heteroatoms include heteroatoms intervening between carbon atoms or between carbon and hydrogen atoms, or between heteroatoms, or between heteroatoms and carbon or hydrogen atoms, in a hydrocarbon structure, such as an ether group, amide group or a secondary or tertiary amino group, acyclic or cyclic azide moieties, and heteroatoms forming a pending functional group, such as a carbonyl group, a halogen or a primary amino group, or hydrazine/hydrazone groups and combinations thereof, such as an ester or amide group. Examples of hydrocarbon groups are aryl groups, such as phenyl or naphtyl, or alkyl groups, such as C1 to C6 alkyl, or combinations between these aryl and alkyl groups, such as alkaryl groups, alkaryl groups wherein the alkyl part further contains one or more aryl substituents, or arylene groups containing one or more further alkyl substituent(s) on the aryl ring. Examples of heteroatoms are O, N, S, P, Si or halogens, such as Cl, F or Br. Preferred examples are O, N, or halogens, such as Cl, F or Br.

Any pair of two of substituents (including substituents containing a cationic group as well as those not containing a cationic group) in appropriate positions may be combined to form a cyclic structure together with the carbon atoms to which they are attached. Substituents, one or more of them, may also function as a bridging groups between two or more tetrapyrrole rings, giving rise to formation of a dendrimer or polymer, or to a supramolecular type of structure combining two or more identical or different tetrapyrrole ring systems.

It will be readily apparent to the skilled reader that the substituents on the tetrapyrrole rings should not be selected so as to have a negative influence on the performance of the chelate complex in the context of the invention. For example, taking into account that it is essential for the chelate complexes in accordance with the invention to contain a cationic group, an anionic substituent in a position to potentially neutralize the effect of the cationic group should preferably be avoided. Preferred are those chelate ligands wherein the sum of the charges, taking into account all atoms with a formal charge contained in the chelate ligands, i.e. also the negative nitrogen atoms of the pyrrole rings, is at least +1, and more preferably at least +2.

In order to be able to immobilize the chelate complex on a support, e.g. a solid support such as a carrier particle, if desired, it may be useful if at least one, preferably one, of the chelate ligand comprises one substituent on the tetrapyrrole ring providing a group which may react with a functional group at the surface of the support. Examples are hydroxyl groups, primary amino groups, carboxyl group (which should preferably used only for immobilization purposes, but should not be present during the oxidation as a potential anionic group), ester group, or an amide group. These groups may be reacted with a surface functional group directly, or, if required, after being activated according to methods known in the art, such as the conversion of carboxyl group to an active ester group, an acid anhydride group, or an acid chloride group. Interaction between chelate complexes and a solid support can be also of electrostatic, e.g. ionic, nature or of coordinative character. Examples are deposition of positively charged chelate complexes on a glass surface, which may be previously etched with strong bases in order to obtain deprotonated negatively charged glass surfaces, or coordination of chelate complexes through sulphur containing substituents to a gold surface. In general, a support can be not only of macroscopic scale (solid support, bulk material), but it can be also on a mesoscopic, nano or molecular scale.

In addition to the chelate ligands containing a porphyrin, phthalocyanine or porphyrazine ring, the chelate complexes used in accordance with the present invention may comprise additional coordinating ligands as needed to complete their preferred coordination spheres. These ligands may be anionic or neutral, and combinations of anionic and neutral ligands may also be present.

In the solid state, one or two negatively charged counter ions present in the structure such as $Cl^-$, $Br^-$, $CN^-$, $OH^-$, etc., or neutral ligands, such as solvent molecules (e.g. water molecules), can be coordinated to the metal centre resulting in a five- or six-coordinate geometry around the metal cation. For example, in the case of $Fe^{3+}$ usually one negative ligand is coordinated, resulting in a five-coordinate complex geometry. In the case of divalent metal cations, it is also possible that no additional ligand, besides the chelate ligand, is coordinated to the metal centre, giving rise to a four-coordinate geometry around metal centre, which can be the case for example with $Ni^{2+}$ and $Co^{2+}$ complexes.

Once the complexes are dissolved in water, aqueous solutions or mixtures of water with any other solvent (organic solvent, ionic liquids), almost exclusively water molecules are coordinated to axial coordination sites of the metal centres which are not occupied by the chelate ligand. In the case of metal cations offering six coordination sites, two water molecules are frequently coordinated in axial positions, resulting in a six-coordinate sphere around the metal cation. Depending on pH of the solution, coordinated water molecules can be deprotonated resulting in corresponding mono- or di-hydroxo complexes.

The cationic substituent attached to the tetrapyrrole ring in the chelate ligand is a substituent which contains at least one atom carrying a positive charge. The atom carrying a positive charge is covalently bound in the cationic substituent. It will be understood that the positive charge is generally a formal positive charge, i.e. a charge which is assigned to an atom in a schematic formula of the substituent, irrespective of the actual electron structure which may result from the delocalization of the charge. Examples of such positively charged atoms are positively charged nitrogen ($N^+$) or phosphorous ($P^+$) atoms.

The term "cationic substituent" as used herein includes a cationic group which is directly attached to the tetrapyrrole ring as well as a cationic group or cationic groups which is/are attached to the tetrapyrrole ring via one or more additional atoms or groups of atoms which serve as a linking group. A cationic substituent may contain one or more than one cationic group(s), such as two, three or four of these groups. For example, multiple cationic groups in one cationic substituent may be bound to the tetrapyrrole ring via a branched linking group. They may also be bound to the tetrapyrrole ring in a linear manner, with one or more additional linking group(s) being present between cationic groups. Combinations of branched and linear structures are of course also possible to combine multiple cationic groups in one cationic ligand.

A chelate ligand may contain one or more than one identical or different cationic substituents, such as two, three or four, each of which may contain one or more than one cationic group(s) carrying a positive charge. Preference is given to chelate ligands with two or more cationic substituents. There are no particular limitations with respect to the total number of cationic groups in the chelate ligand, and it has been found that a higher number of cationic groups tends to increase the reaction rate in the catalytic oxidation (see FIG. 2). Chelate ligands with up to 16, such as 1, 2, 4 or 8 cationic groups can be conveniently prepared. Higher numbers are of course possible, but may not necessarily lead to significant advantages for the oxidation reaction. Thus, it is preferred for the chelate ligand to be used the context of the present invention to contain 2 to 16 cationic groups, and more preferred for it to contain 4 to 16, in particular 4 to 8 cationic groups.

As noted above, a cationic group may be attached directly to the tetrapyrrole ring, or may be attached via a linking group. The linking group as a part of a substituent may be unbranched or branched. If a branched linking group is used, two or more groups carrying a positive charge may be conveniently bound to the linking group.

Examples of linking groups which can be used to covalently attach one or more cationic groups to the tetrapyrrole ring as part of the cationic substituent are hydrocarbon groups which optionally contain one or more heteroatoms. It will be understood that these linking groups are at least divalent. Branching in the linking group may be used to provide higher valent linking groups. Preferred as hydrocarbon groups are hydrocarbon groups with total number of 1 to 30 carbon atoms. Preferred are 0 to 6 heteroatoms in the hydrocarbon groups. The heteroatoms include heteroatoms intervening between carbon atoms or between carbon and hydrogen atoms, or between heteroatoms, or between heteroatoms and carbon or hydrogen atoms, in a hydrocarbon structure, such as an ether group, amide group or a secondary or tertiary amino group, acyclic or cyclic azide moieties, and heteroatoms forming a pending functional group, such as a carbonyl group, a halogen or a primary amino group, or hydrazine/hydrazone groups and combinations thereof, such as an ester or amide group. Typically, heteroatoms in linking groups to which a cationic group is attached are not charged themselves. Examples of hydrocarbon groups are aryl groups, such as phenyl or naphtyl, or alkyl groups, such as C1 to C6 alkyl, or combinations between these aryl and alkyl groups, such as alkaryl groups, alkaryl groups wherein the alkyl part further contains one or more aryl substituents, or arylene groups containing one or more further alkyl substituent(s) on the aryl ring. Examples of heteroatoms are O, N, S, P, Si or halogens, such as Cl, F or Br. Preferred examples are O, N, or halogens, such as Cl, F or Br. In certain preferred embodiments, the linking group is a phenyl group or comprises a phenyl group attached to the tetrapyrrole ring, which phenyl group may be further substituted with one or more alkylene groups, for the attachment of one or more cationic group(s).

It will be understood that the presence of a linking group does not imply that the cationic group must be bound in the substituent in co-position. As illustrated e.g. in FIG. 1, the cationic substituent may comprise a linking group, a cationic group such as a pyridinium group bound to the linking group, and an additional group present as a substituent on the cationic group. Examples and preferred examples of such substituents on the cationic group are the same as those provided above for substituents on the tetrapyrrole ring other than the cationic substituents.

Examples of a cationic group are an ammonium group, a pyridinium group or a phosphonium group.

Exemplary ammonium groups and phosphonium groups are those illustrated by the following formulae (4) and (5). Ammonium groups, in particular those of formula (4), and pyridinium groups are preferred as cationic groups.

$$—N^+(R^a)(R^b)(R^c) \quad (4)$$

$$—P^+(R^a)(R^b)(R^c) \quad (5)$$

In these formulae $R^a$ and $R^b$ are independently selected from hydrogen or alkyl, such as C1 to C6 alkyl, and $R^c$ is selected from hydrogen, alkyl, such as C1 to C6 alkyl, phenyl or benzyl. Furthermore, in formula (4), two groups $R^a$ to $R^c$ may be selected so as to form a 5 to 7-membered heterocyclic ring together with the nitrogen atom to which they are attached, which ring may be saturated or unsaturated and may contain additional heteroatoms, such as morpholine or piperidine.

Pyridinium groups as cationic groups for use in the chelate complexes in accordance with the invention can be directly bound to the tetrapyrrole ring at their 1-, 2-, 3- or their 4-position, with the 4-position being preferred. The resulting pyridinium substituent may have the exemplary structure

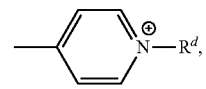

with $R^d$ being, e.g., an alkyl group such as C1 to C6 alkyl. If pyridinium groups as cationic groups for use in the chelate complexes in accordance with the invention are bound to the tetrapyrrole ring via a linking group L, such as the linking groups exemplified above, both the 1- and the 4-position can be used in the same way. For example, the resulting cationic substituent can be schematically illustrated as follows:

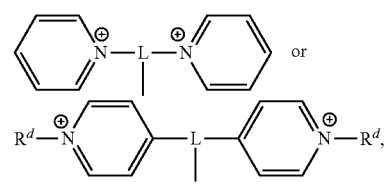

with L being a linking group (in this exemplary case a trivalent one), and $R^d$ being, e.g., an alkyl group, such as C1 to C6 alkyl. Further substituent groups may be attached to the pyridinium ring, e.g. one or more alkyl group(s) such as C1 to C6 alkyl.

In order to ensure that the cationic charge in the cationic substituent is stably provided, e.g. in aqueous solutions at different pH values, it may be useful if no hydrogen atom is directly attached to a positively charged N or P atom in a cationic group. However, it will be understood that, if the process for the oxidation of the sulphide species is carried out under conditions where a significant number of protonated amino groups is present in the chelate ligand, the cationic substituent(s) can be formed in situ by using one or more substituents with primary, secondary and/or tertiary amino group(s).

As exemplary anionic counter ions which may be present singly or in combination to balance the cationic charge(s) in the cationic substituents attached to the chelate rings, reference can be made to hydroxide anions, halogenides, such as chloride, bromide, iodide, fluoride, borate, tetrafluoroborate, perchlorate, nitrate, sulphate, hydrogensulphate, tosylate, acetate, alkylsulphate, trifluoromethylsulphate or benzenesulphate anions. Preferred are inorganic ions such as the hydroxide anions, halogenides, including in particular $Cl^-$ and $Br^-$. In general, any anions which will not interfere during the oxidation process and/or cause negative impact on the catalytic process can be used as counter ions.

In the light of the above, reference can be made as a preferred example of a cationic substituent to a pyridinium group or to a hydrocarbon group which contains one or more ammonium group(s) and/or pyridinium group(s), and which may optionally contain one or more non-charged heteroatoms. Preferred as a hydrocarbon group is a hydrocarbon group with total number of 4 to 50 carbon atoms, more preferably 4 to 30, including any carbon atoms attached to the positively charged atom in the cationic group. Preferred are 0 to 6 heteroatoms, apart from heteroatoms which are contained in the cationic group, in the hydrocarbon group. The heteroatoms include heteroatoms intervening between carbon atoms or between carbon and hydrogen atoms, or between heteroatoms, or between heteroatoms and carbon or hydrogen atoms, in a hydrocarbon structure, such as an ether group, amide group or a secondary or tertiary amino group, acyclic or cyclic azide moieties, and heteroatoms forming a pending functional group, such as a carbonyl group, a halogen or a primary amino group, or hydrazine/hydrazone groups and combinations thereof, such as an ester or amide group. Examples of heteroatoms are O, N, S, P, Si or halogens, such as Cl, F or Br. Preferred examples are O, N, or halogens, such as Cl, F or Br. Examples of hydrocarbon groups are aryl groups, such as phenyl or naphtyl, or alkyl groups, or combinations between these aryl and alkyl groups, such as alkaryl groups, alkaryl groups wherein the alkyl part further contains one or more aryl substituents, or arylene groups containing further alkyl substituents on the aryl ring, and with a preference given to cases where any non-interrupted alkyl group, which may be present in the substituent alone or in combination or as part of the cationic group contains 1 to 6 carbon atoms. The ammonium group(s) and/or pyridinium group(s) as cationic group(s) may be contained in any suitable position in the hydrocarbon group, such as a terminal position or a position within the hydrocarbon structure.

In view of the above, more specific exemplary embodiments of the chelate complexes which can be used in the process of the invention can be illustrated by formulae (6), (7) or (8):

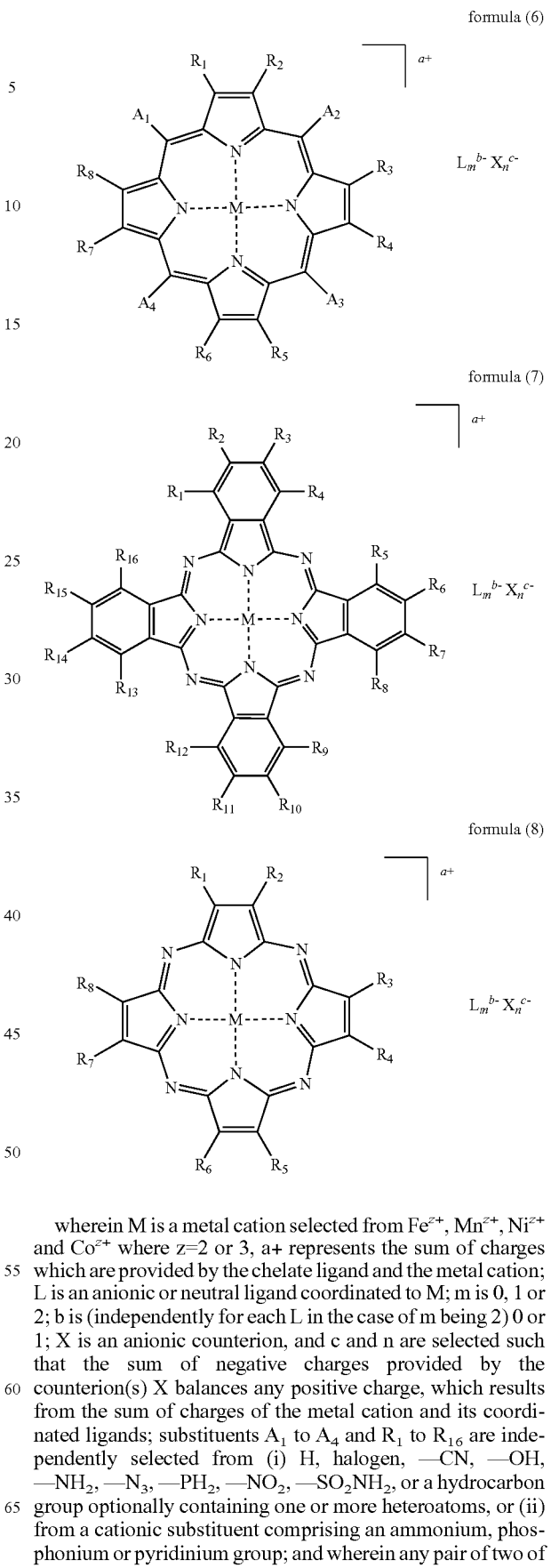

wherein M is a metal cation selected from $Fe^{z+}$, $Mn^{z+}$, $Ni^{z+}$ and $Co^{z+}$ where z=2 or 3, a+ represents the sum of charges which are provided by the chelate ligand and the metal cation; L is an anionic or neutral ligand coordinated to M; m is 0, 1 or 2; b is (independently for each L in the case of m being 2) 0 or 1; X is an anionic counterion, and c and n are selected such that the sum of negative charges provided by the counterion(s) X balances any positive charge, which results from the sum of charges of the metal cation and its coordinated ligands; substituents $A_1$ to $A_4$ and $R_1$ to $R_{16}$ are independently selected from (i) H, halogen, —CN, —OH, —$NH_2$, —$N_3$, —$PH_2$, —$NO_2$, —$SO_2NH_2$, or a hydrocarbon group optionally containing one or more heteroatoms, or (ii) from a cationic substituent comprising an ammonium, phosphonium or pyridinium group; and wherein any pair of two of the substituents in appropriate position may be combined to form a cyclic structure together with the carbon atoms to which they are attached, with the proviso that the chelate ligand in each of the chelate complexes of formulae (6), (7) and (8) contains at least one cationic substituent.

It will be understood that, for the hydrocarbon group optionally containing one or more heteroatoms as a substituent other than the cationic substituent and for the cationic substituent comprising an ammonium, phosphonium or pyridinium group in formulae (6), (7) and (8), the same exemplary definitions and preferred definitions apply as they were provided above with respect to formulae (1), (2) and (3).

Preferably, M in formulae (6), (7) and (8) is selected from $Fe^{3+}$, $Mn^{3+}$, $Co^{2+}$ and $Ni^{2+}$, and most preferably $Fe^{3+}$ is used as a metal cation for the chelate complexes in the context of the invention. For $Fe^{3+}$ or $Mn^{3+}$, m is preferably 1 or 2. For $Co^{2+}$ and $Ni^{2+}$, m is preferably 0.

Preferred ligands L in formulae (6), (7) and (8) are selected from $H_2O$, $Cl^-$, $Br^-$, $CN^-$ or $OH^-$. Preferred anionic counterions X are selected from hydroxide anions, halogenides, such as chloride, bromide, iodide, fluoride, borate, tetrafluoroborate, perchlorate, nitrate, sulphate, hydrogensulphate, tosylate, acetate, alkylsulphate, trifluoromethylsulphate or benzenesulphate anions.

In addition, in the complexes of formula (6), it is preferred that at least two of the substituents $A_1$ to $A_4$ or all four of $A_1$ to $A_4$ represent a cationic substituent comprising an ammonium, phosphonium or pyridinium group, and that the remaining substituents of $A_1$ to $A_4$ and $R_1$ to $R_8$ are independently selected from H, halogen, —CN, —OH, —$NH_2$, —$N_3$, —$PH_2$, —$NO_2$, —$SO_2NH_2$, or a hydrocarbon group which may contain one or more heteroatoms.

In the complexes of formula (7) and formula (8), it is preferred that two, three or four of $R_1$ to $R_{16}$ and $R_1$ to $R_8$, respectively, represent a cationic substituent comprising an ammonium, phosphonium or pyridinium group, and that the remaining substituents of $R_1$ to $R_{16}$ and $R_1$ to $R_8$, respectively are independently selected from H, halogen, —CN, —OH, —$NH_2$, —$N_3$, —$PH_2$, —$NO_2$, —$SO_2NH_2$, or a hydrocarbon group which may contain one or more heteroatoms.

For any cationic substituent in the complex of formula (6), (7) or (8), it is preferred that the substituent comprises a pyridinium group and/or an ammonium group of formula (4) as defined above. It is further preferred that the cationic substituent is selected from a pyridinium group or from a hydrocarbon group containing one or more than one pyridinium groups and/or ammonium groups. The hydrocarbon group optionally contains additional non-charged heteroatoms. Preferred as a hydrocarbon group is a hydrocarbon group with total number of 4 to 50 carbon atoms, more preferably 4 to 30, including any carbon atoms attached to the positively charged atom in the cationic group. Preferred are 0 to 6 heteroatoms, apart from heteroatoms which are contained in the cationic group, in the hydrocarbon group. The heteroatoms include heteroatoms intervening between carbon atoms or between carbon and hydrogen atoms, or between heteroatoms, or between heteroatoms and carbon or hydrogen atoms, in a hydrocarbon structure, such as an ether group, amide group or a secondary or tertiary amino group, acyclic or cyclic azide moieties, and heteroatoms forming a pending functional group, such as a carbonyl group, a halogen or a primary amino group, or hydrazine/hydrazone groups and combinations thereof, such as an ester or amide group. Examples of heteroatoms are O, N, S, P, Si or halogens, such as Cl, F or Br. Preferred examples are O, N, or halogens, such as Cl, F or Br. Examples of hydrocarbon groups are aryl groups, such as phenyl or naphtyl, or alkyl groups, or combinations between these aryl and alkyl groups, such as alkaryl groups, alkaryl groups wherein the alkyl part further contains one or more aryl substituents, or arylene groups containing further alkyl substituents on the aryl ring, and with a preference given to cases where any non-interrupted alkyl group, which may be present in the substituent alone or in combination or as part of the cationic group contains 1 to 6 carbon atoms. The ammonium group(s) and/or pyridinium group(s) as cationic group(s) may be contained in any suitable position in the hydrocarbon group, such as a terminal position or a position within the hydrocarbon structure.

Preferred examples for any substituent other than a cationic substituent in the complexes of formula (6), (7) or (8), are hydrogen and hydrocarbon groups with total number of 1 to 30 carbon atoms, optionally containing 0 to 6 heteroatoms. Further preferred as substituents other than the cationic substituent(s) covalently attached to the ring are hydrogen atoms and hydrocarbon groups having 1 to 12 carbon atoms and containing 0, 1, 2 or 3 heteroatom(s). The heteroatoms include heteroatoms intervening between carbon atoms or between carbon and hydrogen atoms, or between heteroatoms, or between heteroatoms and carbon or hydrogen atoms, in a hydrocarbon structure, such as an ether group, amide group or a secondary or tertiary amino group, acyclic or cyclic azide moieties, and heteroatoms forming a pending functional group, such as a carbonyl group, a halogen or a primary amino group, or hydrazine/hydrazone groups and combinations thereof, such as an ester or amide group. Examples of hydrocarbon groups are aryl groups, such as phenyl or naphtyl, or alkyl groups, such as C1 to C6 alkyl, or combinations between these aryl and alkyl groups, such as alkaryl groups, alkaryl groups wherein the alkyl part further contains one or more aryl substituents, or arylene groups containing one or more further alkyl substituent(s) on the aryl ring. Examples of heteroatoms are O, N, S, P, Si or halogens, such as Cl, F or Br. Preferred examples are O, N, or halogens, such as Cl, F or Br. More preferred examples for any substituent other than a cationic substituent are selected from H, halogen, or a $C_{1-6}$ hydrocarbon group, such as a $C_{1-6}$ alkyl. In particular they are H.

Besides the effect of the charge of the chelate complex on its catalytic activity mentioned above, the nature of the metal centre also plays a role. By studying the catalytic activity of chelate complexes containing different metal centres it was demonstrated that in the case when the overall charge of the chelate complex is the same, the chelate complexes containing iron as the metal centre posses the higher catalytic activity. Somewhat lower activity is detected for cobalt chelate complexes. Nickel complexes have a somewhat lower activity than cobalt complexes, and manganese complexes posses the lowest activity in comparison to the other tested metal centres. Therefore, the catalytic activity depends on the metal centre in the chelate complex and decreases in the following order: Fe>Co>Ni>Mn (FIG. 3). It might be possible that the immobilisation of the chelate complexes on different supports can change the above mentioned relative order of the catalytic activity as a function of the metal centre.

In the process for the catalytic oxidation of sulphide species in accordance with the invention, the chelate complex, the oxygen and the sulphide species are generally brought into contact in a liquid medium. Preferably, the liquid medium is a polar solvent, and particularly preferred for practical reasons is water or an aqueous solution as a liquid medium. An aqueous solution or aqueous phase, in the context of this invention, is a solution containing more than 50% of water, in terms of the volume of water in relation to the total volume of solvent, preferably more than 70% and particularly more than 90%. Due to the presence of a cationic charge, the chelate complexes to be used in accordance with the invention generally show a sufficient solubility in water to dissolve in catalytically active amounts. For example, concentrations of the chelate complexes in water of up to 10 mmol/l can be provided, which are well sufficient to oxidize amounts of sulphide species as they are frequently found as pollutants in various liquid or gaseous media. If a higher concentration of the chelate complex in water/an aqueous solution was considered desirable, small amounts of an organic solvent such as DMSO in the liquid phase can be used to further increase the solubility. Of course, it is also possible to revert to complexes with a higher number of positive charges to increase the solubility in polar solvents. It is also possible to incorporate the chelate complexes into supramolecular structures, e.g. dendrimeric structures or micellar structures. However, it is one of the advantages of the process in accordance with the invention that the activity of the chelate complexes is high, such that low concentrations are sufficient to effectively oxidize the sulphide/hydrogen sulphide species. Thus, in the case of oxidation reactions in a liquid phase, depending on the concentration of sulphide species that should be removed, concentrations of the chelate complexes in the range of 1 µM to 10 mM, preferably 1 to 100 µM are sufficient.

As indicated above, the chelate complex can be dissolved in a liquid phase and can be contacted with the sulphide species and the oxygen in solution. This principle can further be adapted to systems having different liquid phases, e.g. an organic lipophilic and an aqueous/water phase. However, it is also possible to immobilize the chelate complex on a support which is in contact with the liquid phase where the oxidation takes generally place and which is preferably insoluble in the liquid phase. Such heterogeneous systems may be advantageous e.g. in cases where the sulphide species to be oxidized are contained in a stream of a liquid, or a gas phase in a contact with a liquid, which may flow along the immobilized chelate complexes. Suitable supports may be of any kind, including planar surfaces, particulate surfaces, microporous materials or mesh structures. Nanoparticles, preferably with a size in the range of up to 500 nm, are also included. As mentioned above, a support can be of macroscopic (solid support, bulk material etc.), mesoscopic, nano (e.g. negatively charged dendrimeric structures and different supramolecular systems and their aggregates) or molecular scale. Thus, a support can also be partially or completely soluble in the liquid phase (depending on the molecular scale of a support), and in such case it can form adducts or supramolecular structures in the solution with the chelate complexes used in the context of the invention. Materials for the support are not particularly limited and include clays and glass (which, due to a negative charge surface, may bind the positive charged chelate ligands via electrostatic interactions; see examples), or adsorbent materials such as zeolites, or polymers carrying suitable functional groups for covalent or electrostatic immobilization, or metals, or carbon rich materials, where besides covalent, coordinative and electrostatic interactions also simple adsorption/adhesion can keep chelate complexes in connection with a support material.

The immobilization via electrostatic interaction is a particularly convenient method for the immobilization of the chelate complexes used in the context of the invention, which carry (a) cationic substituent(s). Generally, it is sufficient to contact the chelate complexes in accordance with the invention with a surface containing a negative charge. For example, immobilization of the complexes on clays with different granulation (example of macroscopic support) as well as on polymers providing negative charges and dendrimeric structures (example of a support on a nano scale), resulting in supramolecular systems, leads to successful catalytic processes. Thus, a large diversity of catalytic set-ups that can be optimized according to particular needs and applications by varying a number of parameters, such as the size and shape of the support, or the degree of loading of the complexes on the support, can be provided.

Clays which can be used as a support for the immobilization of the chelate complexes used in accordance with the invention include, for example, layer silicate clays such as montmorillonite. The clay granulation can be adapted to particular needs. Exemplary specific surface areas of suitable clays range from 10 to 500 m$^2$/g. Preferred in terms of their handling and the resulting catalytic activity are clays with specific surface areas of 100-300 m$^2$/g, in particular 200-300 m$^2$/g. The amount of chelate complex to be loaded onto the clay is not particularly limited, and amounts below 1 mg complex per 1 g of clay already give rise to a catalytic activity. Generally, the amount ranges from 0.5 to 100 mg complex per 1 g of clay, preferably from 1 mg to 50 mg per 1 g of clay. The catalytic activity generally increases with increasing load of complex. In addition, via optimization of the catalytic material (clay granulation and amount of catalyst per gram of clay), the decrease of the catalytic activity with increasing number of oxidation cycles can be minimized, i.e. turnover numbers can be increased.

Dendrimeric structures providing negative charges, such as poly(amido amine) (Pamam) species with anionic groups, can be mentioned as exemplary support materials on a nanometer scale. An example for such a material is Pamam G4.5. Such immobilization results in a new type of supramolecular structures. It has been found that also for these structures the catalytic activity does not decrease significantly with increased number of reaction cycles. That means that by application of negative dendrimeric carriers the turnover numbers of the catalysts can also be optimized. Immobilization on negatively charged dendrimeric structures may result in higher turnover numbers than in the case of immobilization on clays.

As an example of a polymer containing a negative charge, reference can be made to poly(styrenesulfonate) (PSS). Support materials containing such polymer can also be favourably used for the immobilization of the chelate complexes via electrostatic interaction. For example, the negatively charged polymers can be combined with a polycation, resulting in a material that comprises two ionomers. One known type of such a material which can be used as a support in the context of the invention is poly(3,4-ethylenedioxythiophene)/poly(styrenesulfonate) (PEDOT/PSS). Excellent catalytic activity was observed for these types of polymer.

In case of immobilization of chelate complexes on dendrimers as well as on polymers, just a slight decrease of the catalytic activity was observed after repeated addition of sulphide species, but the activity was recovered after a time break.

For the immobilized catalysts in general, as for those used in homogeneous systems, the catalytic activity can be increased by increasing the positive charge of our catalysis (e.g. by increasing the number of cationic substituents bound to the ring of the chelate ligand. In addition, an increase in the overall positive charge of the applied catalyst (or catalytic material resulted upon immobilization of the catalysts on a carrier) results not only in a higher rate of sulfide removal, but also has a stabilizing effect on the activity in repeated catalytic cycles. In general, immobilization may be advantageous over homogeneous catalysis, because it increases turnover numbers.

As noted above, an important aspect of the invention is the removal of sulphide, mono- and/or dihydrogen sulphide from a liquid or gaseous medium, comprising the oxidation of the sulphide, mono- and/or dihydrogen sulphide in accordance with the process described in detail above. For example, the oxidation process provides the possibility of oxidising the sulphide species to elemental sulphur, which precipitates from the liquid or gaseous medium and which can be conveniently collected and/or removed in this form from the liquid or gaseous medium.

As also indicated above, such sulphide species can be present as undesirable pollutants in a variety of liquid and gaseous media, such as water, refinery process streams, natural gas, biogas (typically gas obtained from the fermentation of biomass) and exhaust gases. In exemplary embodiments, the process for the removal of sulphide, mono- and/or dihydrogen sulphide thus encompasses the removal of these species from water, refinery process streams, natural gas, biogas and exhaust gases.

The process for the removal of the sulfide species in accordance with the invention can be carried out both in steady state systems and in flow systems. Since the chelate complex acts as a catalyst and is not spent during the oxidation process, fresh catalyst will only have to be added in extended time intervals. As noted above, the oxygen needed for this process can be conveniently supplemented from air.

As for sulphide species contained in a liquid medium, it is possible to introduce the chelate complex and oxygen directly into the liquid medium where the sulfide species is present. In the case of nonpolar liquids, such as hydrocarbons, containing the sulfide species, it is preferred to contact the liquid hydrocarbon with water or an aqueous phase containing the chelate complex and oxygen. Due to the solubility of the sulphide species in water, they are efficiently transferred from the nonpolar phase to the polar aqueous phase, where they can be oxidized in accordance with the invention, and after that clean nonpolar phase can be easily separated.

In the case of sulphide species contained in a gaseous medium, it is possible to allow a gas stream to get in contact with a liquid phase or, if needed, to bubble it through a liquid phase, in particular water or an aqueous phase, which contains the chelate complex and oxygen.

EXAMPLES

The chelate complexes used in the following examples are commercially available from Porphyrin Systems GbR (Mühlenweg 143 D-22844 Norderstedt, Germany) or were synthesised according to methods described in: D. Balbinot, Synthese and Aggregationseigenschaften hochgeladener, wasserlöslicher Metalloprophyrine, Dissertation Universität Erlangen-Nürnberg, 2006, available e.g. at http://www.opus.ub.uni-erlangen.de/opus/volltexte/2006/339/, or in D. M. Guldi, G. M. A. Rahman, N. Jux, D. Balbinot, U. Hartnagel, N. Tagmatarchis and M. Prato, J. Am. Chem. Soc. 2005, 127, 9830-9838. The contents of both documents are incorporated by reference.

The solutions of sulphide species were prepared using $Na_2S$ as a source of $H_2S/HS^-$ equilibrium mixtures in buffered solutions. 50 mM phosphate buffer (KPi) was prepared with nano-pure water, stirred with Chelex-100 resins to remove traces of heavy metals and kept above the resins until used. Sodium sulphide ($Na_2S$) was purchased as anhydrous, opened and stored in glove box (<2 ppm $O_2$ and <1 ppm $H_2O$). 1 M and 1 mM stock solutions of sodium sulphide were prepared in the glove box using argon-bubbled nano-pure water and stored in glass vials with PTFE septa at +4° C., not longer than one week. Concentration of hydrogen sulphide was determined using $H_2S$ selective electrode connected to Free Radical Analyzer (WPI). Gas-tight Hamilton syringes were used throughout the study.

Homogeneous Catalysis

To test the ability of tetrapyrrole metal complexes to oxidize hydrogen sulphide in and remove it from the solution, five different iron porphyrin models were used: two bearing negative charges, and three with positive charges (FIG. 1). Iron porphyrins without charged substituent on the chelate ligand (synthesis are described in J. Am. Chem. Soc. 2007, 129, 4217-4228) were also tested in non-aqueous solutions (predominantly DMSO) and in the DMSO/water mixtures. In direct time-resolved measurements of $H_2S$ concentration during the reaction course, demonstrated in FIG. 2a, it has been shown that only complexes with positively charged chelate ligands react catalytically with $H_2S$ and efficiently remove it from the solution. The reaction was carried out under catalytic conditions, with $H_2S$ in excess.

In order to carry out the oxidation, a $H_2S$ electrode was placed into reaction chamber, provided by the manufacturer (World Precision Instruments), containing 2 mL of 50 mM KPi, pH 7.4. The system was open and exposed to air with constant stirring. Different volumes of 100 mM stock solution of $Na_2S$ were injected in order to achieve defined concentration (for example, 1 µL of 100 mM $Na_2S$ was injected into 1,999 mL of 50 mM KPi, pH 7.4, in order to achieve 50 µM concentration of sulphide). The effect of different complexes was investigated in the following way: ca. 2 mL of solution with predefined concentration of the complex dissolved in 50 mM KPi was added into the reaction chamber and when the electrode baseline was stable stock solution of sodium sulphide was added to achieve the desired concentration. Each experiment was done at least in triplicate. For each set of measurements, a corresponding control measurement, which did not include the complex, was carried out. All experiments were performed at room temperature (ca. 20° C.).

As a result, it could be demonstrated that the FeP4+, FeP'4+ and FeP8+ porphyrins (cf. FIG. 1 and FIG. 2a) act as efficient catalysts for $H_2S$ removal. Increase in number of cationic charges (from 4 to 8) increased the efficiency of $H_2S$ removal. P4+ and P'4+ were mostly used as representatives of positively charged tetrapyrroles.

To be sure that the chelate complexes act as true catalysts, mass spectrometric analysis of the reaction mixture before and after the reaction was performed and it confirmed that the complexes stay intact with metal centre being in 3+ oxidation state, as in the starting complexes (FIG. 4). The iron-catalysts are able to completely remove $H_2S$ and remain unchanged after the reaction without a need for reactivation/reoxidation. To test this, sequential bolus additions of 20 fold excess of $H_2S$ were added into FeP4+ solution and in each cycle complex was able to completely remove $H_2S$ (FIG. 5). The experiment yields a turnover number (TON) for FeP4+ higher than 1000, and turnover frequency (TOF) of 8 $min^{-1}$. Bare, uncharged porphyrins did not have any effect on $H_2S$ removal from organic solvents (acetonitrile, DMSO) and their aqueous mixtures. Negatively charged porphyrins also did not show significant effect on hydrogen sulphide removal from the aqueous solution (FIG. 2a), i.e. they can react only stoichiometricaly with sulphide species. This indicates that positive groups on a tetrapyrrole ring attract the sulphide species and thus increase the binding and oxidation of hydrogen sulphide.

Getting further into understanding the mechanism of this catalysis, the reaction of P4+ with sulphide species was performed in anaerobic and aerobic conditions. Complete removal of oxygen from the reaction mixture caused only stoichiometric reaction between two reactants, in which $Fe^{3+}$ got reduced into $Fe^{2+}$, which has characteristic absorption maximum at 430 nm (FIG. 6A). When oxygen was present, however, poprhyrin ended up in catalytically active intermediate specie, with Soret band at 408 nm which upon consumption of $H_2S$ and oxygen during the time was transformed back in to the starting $Fe^{3+}$ porphyrin (FIG. 6B). FIG. 6 shows that immediately after mixing with sulphide species, the initial high-spin $Fe^{3+}$ complex is transformed into low-spin $Fe^{3+}$ (this specie correspond to catalytically active intermediate specie seen at 408 nm in UV-VIS spectrum) (FIG. 6B). The low-spin $Fe^{3+}$ nature of this catalytically active intermediate has been confirmed by Mössbauer and EPR spectra (FIG. 7). During the time, re-formation of starting high-spin iron 3+ could be observed (FIG. 7C). This observation further confirmed that after the reaction completion, catalyst stays unchanged and is available for new catalytic cycles. The overall reaction that is catalyzed is oxidation of $H_2S$ by oxygen, so oxygen is required for efficient removal of $H_2S$ and the reaction rate is dependent on oxygen concentration (e.g. $K_{obs}$ on 21% saturation drops from 17 $s^{-1}$ to 4.5 $s^{-1}$ on 11% of oxygen saturation).

The reaction was tested at pH 4 and pH 7.4 and at both pH values the effect was obvious. Products of $H_2S$ oxidation were, however different, with sulphur being formed at acidic pH and thiosulphate formed at more neutral pH. Acidification of reaction mixture after the reaction at pH 7.4 led to formation of sulphur. This is especially convenient for easier industrial removal.

For a potential application reaction was tested also in ionic liquids, which nowadays have versatile industrial application, and where the highly charged porphyrin complexes are very well soluble. The reaction is also catalytic but much slower due to the high viscosity of the ionic liquids. Especially slow seems to be the binding of oxygen to the redox active iron centre in the ionic liquids. This shows again that the very efficient oxygen binding to the initially reduced iron centre by sulphide species is crucial for the efficient catalytic removal of sulphide species. The complexes presented here have exactly this ability and therefore they do not need additional efforts to be regenerated/reoxidized, and therefore are excellent catalysts for removal of sulphide species.

Although the reaction in ionic liquids is slow, it can have application for the purification of ionic liquids, i.e. removal of sulphide species from ionic liquids, since as a product elemental sulphur is obtained, which can be easily separated, and no additional reoxidation efforts of the catalysts are needed.

In the experiments with chelate complexes that contain Co, Ni and Mn (see FIG. 1) a similar experimental procedure as for the above mentioned iron complexes was used. For example, 1 mM aqueous solutions of $MP'4+(M=Co^{2+}, Ni^{2+}, Mn^{3+}, Fe^{3+})$ or FeP4+ were prepared. $H_2S$ was provided by a 100 mM solution of $Na_2S$ in water (degassed with argon for 15 min), which was prepared in a glove box under nitrogen atmosphere. The measurements were conducted in a measuring cell with a four-channel free radical analyser (WPI TBR4100). During measurement, the current change (in pA) caused by the $H_2S$ oxidation at the electrode versus time was recorded. At this, the current corresponds to the concentration of $H_2S$ in the solution. To maintain a certain equilibrium mixture of $HS^-/H_2S$ in the measured solution the pH value of 7.4 was adjusted by a 300 mM solution of potassium phosphate in water. For the measurements the volumes of the single solutions were added to the cell with a total volume of 2 mL as given in Tables 1 and 2. It must be pointed out that the sulfide solution was added at last after the baseline was recorded.

TABLE 1

Employed volumes for the measurements with the Co- and Ni-complex

| V (Potassium phosphate buffer solution) [mL] | V(Porphyrin complex solution) [μL] | V ($Na_2S$ solution) [μL] |
|---|---|---|
| 1.99 | 10 | 4 |
| 1.98 | 20 | 4 |
| 1.97 | 30 | 4 |
| 1.96 | 40 | 4 |

TABLE 2

Employed volumes for the measurements with the Mn- and Fe-complex

| V (Potassium phosphate buffer solution) [mL] | V(Porphyrin complex solution) [μL] | V (Na2S solution) [μL] |
|---|---|---|
| 1.98 | 20 | 4 |
| 1.96 | 40 | 4 |

For reference purposes, measurements of a solution without tetrapyrrole complex catalyst were recorded (2.00 mL potassium phosphate solution plus 4 μL $Na_2S$ solution).

In order to compare the catalytic activity of the examined metal complexes, half-lifes $t_{1/2}$ and $k_{obs}$ values were determined (Table 3) by a first order exponential fit of the obtained kinetic trace (for example in FIG. 3: current vs. time).

There is the following relationship between half-life $t_{1/2}$ and rate constant $k_{obs}$:

$$k_{obs} = \frac{\ln 2}{t_{1/2}}$$

Thus, $k_{obs}$ can easily be calculated from the obtained half-lifes.

TABLE 3

Half-lifes $t_{1/2}$ and rate constants $k_{obs}$ for $H_2S$ oxidation for the four porphyrin catalysts in homogeneous solution, (V($Na_2S$) = 4 μl, c($Na_2S$) = 2.0 * $10^{-4}$ mol/L, c(Cat.) = 2.0 * $10^{-5}$ mol/L)

| Cat. | V(Cat.) [μl] | $t_{1/2}$ [s] | $k_{obs}$ [$s^{-1}$] |
|---|---|---|---|
| — | 0 | 1032 | 0.001 |
| FeP4+ | 40 | 22.1 | 0.031 |
| CoP'4+ | 40 | 40.1 | 0.017 |
| NiP'4+ | 40 | 247 | 0.003 |
| MnP'4+ | 40 | 332 | 0.002 |

It can be seen that the uncatalyzed reaction showed the longest half-life ($t_{1/2}$=1032 s) and thus proceeds slowest. The reaction catalysed by the iron complex ($t_{1/2}$=22.1 s) takes place fastest. Among the catalyzed reactions, the one that proceeded slowest was the one catalysed by the manganese complex ($t_{1/2}$=332 s).

It was found that the rate of the reaction depends on the metal centre in the chelate complex and decreases in the following order: Fe>Co>Ni>Mn (FIG. 3). It might be possible that the immobilisation of the chelate complexes on different supports can change the above mentioned relative order of the catalytic activity as a function of the metal centre.

It was thus confirmed that, in general any Fe, Co, Ni and Mn chelate complexes as defined herein, which contain one or more cationic substituent(s), have catalytic activity for removal of sulphide species.

Immobilized Chelate Complexes

To further illustrate the activity in a heterogeneous catalysis, experiments were performed with immobilized complexes, Immobilization on Glass Surfaces In order to deposit the tetrapyrrole on the glass, the surface of the glass first was etched with strong bases, e.g. KOH or LiOH. The base deprotonates the hydroxyl groups forming a negative charge on the glass surface (FIG. 8). Potassium or lithium act as counter ions (Karin ROSENLEHNER, Dissertation, Friedrich-Alexander-Universität Erlangen-Nürnberg, 2010).

Positively charged porphyrin complexes could be conveniently attached on the negatively charged silica surface by dipping the glass in a solution of the appropriate porphyrin complexes (Karin ROSENLEHNER, Dissertation, Friedrich-Alexander-Universität Erlangen-Nürnberg, 2010). Due to the positive charge on the porphyrin complex, a monolayer of it could be formed on the surface. This monolayer of the porphyrin could be seen in a faint absorption in an UV/VIS spectrum. In particular, glass beads made of quartz were etched and overlayed with the metal porphyrin complexes. Glass beads (acid-washed, 150-212 μm) were obtained from Sigma-Aldrich. The glass beads were etched for several hours in a hot, saturated solution of KOH in water. Subsequently, the lye was decanted and the beads were washed with water until washing water had a pH value of 7. In each case the beads then were stirred over night in the solutions of the cobalt and nickel porphyrins CoP'4+ and NiP'4+. Afterwards, the porphyrin complex solution was decanted and the coated beads were washed several times with water until washing water was colourless. Finally, the beads were dried in hot air (oven). For the measurement with the coated glass beads 3 mL potassium phosphate solution (300 mM) and 4 μL $Na_2S$ solution (100 mM) were stirred with 360 mg porphyrin coated glass beads. After two, 15, 30, 45 and 60 min 50 μL of this solution was transferred into the measuring cell after a baseline from 2 mL potassium phosphate solution was recorded. The same procedure was repeated without the catalyst coated glass beads. With the glass beads, the decay of the current with the time is shown in FIG. 9.

It can be seen that the catalysed $H_2S$ oxidation proceeded relatively fast compared to the uncatalysed one although only a molecular monolayer of the complex was present on the glass surface. This shows that the process in accordance with the present invention is also suitable for heterogeneous catalytic applications as a matter of principle.

Immobilization on Clay

Types of Clays and their Pre-Treatment

The following types of sodium montmorillonites with different grain sizes were used as clays:

KSF: specific surface area 20-40 $m^2/g$
K10: specific surface area 220-270 $m^2/g$
K30: specific surface area ~330 $m^2/g$ Sodium-$K_{30}$ was purchased. The sodium forms of KSF and $K_{10}$ were prepared by stirring 7 g of the respective clay in 500 ml of 1 M NaCl for 4 days. Subsequently, the suspension was centrifuged and washed 7 times with 50 ml of water until chloride could no longer be detected in the wash water. Drying in the drying cabinet was performed for 1 day at 50° C.

Commercially available KSF (slightly yellowish) contains soluble Fe(III) compounds (red with $SCN^-$) which were removed during the washing process. The commercially available prototype of K10 also contains Fe(III) ions, but in smaller amounts.

Loading the clay with chelate complex and purification:

KSF and K10: 400 mg of the respective $Na^+$ clay are suspended in 20 ml of water and subsequently the corresponding amount of chelate complex, likewise diluted in 20 ml of water, is added. The mixture is left to stand without stirring. Partial sedimentation of the clay can be observed. The binding of the chelate complex takes place quickly, about 2 h are sufficient. Longer absorption times do not improve the result. The loaded clay is washed with 60 ml of water (3×20 ml), the suspension is centrifuged and subsequently dried in the drying cabinet for 1 day at 50° C.

K30: The clay is likewise charged in water, but since the clay is less convenient to centrifuge, precipitation is performed using acetone in accordance with the following procedure: 150 ml of acetone are added to 40 ml of water and left to stand for at least 1 day. Subsequently, the supernatant (slightly cloudy and greenish) is removed using a pipette. Subsequently, washing with 20 ml of pure acetone is performed (the centrifugate is clear and colorless) and centrifugation is repeated. The combined centrifugates are again admixed with 30 ml of acetone, then centrifuged and dried in the drying cabinet at 50° C.

The following Table 4 lists the loaded clays with chelate complexes immobilized thereon which were prepared and tested in the context of the examples. For each of the loaded clays prepared in accordance with the above general description, the indicated amount of the chelate complex FeP4+ (cf. FIG. 1) was added to 400 mg of the sodium form of the indicated clay (Na-KSF, Na-K10, Na—K30). The third row in the table indicates the theoretical load of the chelate complex in the loaded clay, calculated on the basis of the amount of starting products.

TABLE 4

| | Name of loaded clay | Added amount of complex [mg] | mg complex/g clay (calculated) |
|---|---|---|---|
| Na-KSF | 1-KSF | 0.29 | 0.72 |
| | 2-KSF | 0.58 | 1.45 |
| | 3-KSF | 1.16 | 2.89 |
| | 4-KSF | 2.32 | 5.77 |
| | 5-KSF | 4.65 | 11.49 |
| | 6-KSF | 9.32 | 22.77 |
| Na-K10 | 1-K10 | 0.29 | 0.72 |
| | 2-K10 | 0.58 | 1.45 |
| | 3-K10 | 1.16 | 2.89 |
| | 4-K10 | 2.32 | 5.77 |
| | 5-K10 | 4.65 | 11.49 |
| | 6-K10 | 9.32 | 22.77 |
| Na-K30 | 1-K30 | 0.29 | 0.72 |
| | 2-K30 | 0.58 | 1.45 |
| | 3-K30 | 1.16 | 2.89 |
| | 4-K30 | 2.32 | 5.77 |
| | 5-K30 | 4.65 | 11.49 |
| | 6-K30 | 9.32 | 22.77 |

Oxidation of Hydrogen Sulfide in the Presence of Charged Complexes

Oxidation with Unloaded Clay (Reference Example)

General procedure: 16 mg of clay (sodium form of montmorillonite) are suspended in 2 ml of phosphate buffer (0.3 M, pH 7.5) at room temperature in air. Subsequently sulfide is added. FIG. 10 compares the results obtained for the oxidation of $H_2S$ (pH 7.5 (0.3 M phosphate buffer, $Na_2S$ 0.5 mM, RT) in the absence and in the presence of uncharged clay. It can be seen that the presence of the unloaded clay has only a minimum accelerating effect on the oxidation of the hydrogen sulfide with atmospheric oxygen.

Oxidation with Clay Loaded with FeP4+

All measurements discussed in the following were performed using the catalysts described in Table 4 (400 mg of clay+x mg of FeP4+). General procedure: 16 mg of clay are suspended in 2 ml of phosphate buffer (0.3 M, pH 7.5) at room temperature in air. Subsequently sulfide is added ($Na_2S$ 0.5 mM). With all three grain sizes tested for the clay, it can be observed that as the concentration of the complex increases, the oxidation rate of hydrogen sulfide increases (FIG. 11-FIG. 13). This demonstrates that the catalytic effect originates from the chelate complexes, and not from some component within the clay.

Several oxidation cycles can be run (one oxidation cycle corresponds to an addition of 10 μl of a 0.1 M $Na_2S$ solution into 2 ml of the reaction mixture). The reduction rate decreases from cycle to cycle. Most promising are the clay types KSF and K10. With 1-K10, already after the $4^{th}$ cycle the starting value without porphyrin is reached. 6-KSF and 6-K10 show catalytic activity even after the $6^{th}$ cycle (for KSF, FIG. 14) and the $11^{th}$ cycle (for K10, FIG. 15, 16), respectively. However, the decrease in reaction rate per cycle seems to be more pronounced with KSF (FIG. 14, FIG. 15). Thus, the medium grain size K10 appears to be particularly beneficial.

Loaded Clay 5-K10 could be shown to be extremely active. The oxidation rate for this clay is higher than the one for 6-K10. The reaction rate for the uncatalyzed reaction is achieved in the $25^{th}$ cycle (FIGS. 17, 18)

Oxidation with Clay Loaded with FeP8+

The clay is loaded with FeP8+ (cf. FIG. 1) as described above. Again, the smaller grain sizes seem to be better suited for binding the chelate complex.

TABLE 5

| Name of loaded clay | | Added amount of complex [mg] | mg complex/g clay (calculated) |
|---|---|---|---|
| Sodium-KSF | 1-KSF-P8+ | 0.867 | 2.16 |
|  | 6-KSF-P8+ | 27.84 | 65.1 |
| Sodium-K10 | 1-K10-P8+ | 0.867 | 2.16 |
| Sodium-K30 | 1-K30-P8+ | 0.867 | 2.16 |

In line with the results obtained in a homogeneous solution, it is observed that the reaction proceeds faster than with FeP4+-loaded clay. With 6-KSF—P8+, the oxidation rate decreases again as the number of oxidation cycles increases. With 1-KSF—P8+, no clear rate decreasing tendency can be observed (FIG. 19, 20).

Oxidation of Biogas with Clay Loaded with FeP4+

The composition of the biogas was 2% of $H_2S$, 35% of $CO_2$, 63% of $CH_4$. For the preparation of a biogas solution, the biogas is passed through degassed water. For the oxidation reaction, 16 mg of loaded clay (3-K10) are suspended in 2 ml of phosphate buffer (0.3 M, pH 7.5) at room temperature and in air. Subsequently the biogas solution is added. As can be seen in FIG. 21, even after the addition of the biogas solution, the complete oxidation of sulfide is observed.

Immobilization on Dendrimeric Structures

Oxidation of Hydrogen Sulfide with FeP4+ in the Presence of Pamam G4.5

FIG. 22 schematically shows the structure of poly(amido amine) (Pamam) G4.5, with the filled circles representing groups —$N(CH_2CH_2C(O)NHCH_2CH_2)_2$ and the open circles representing a group —$C(O)O^-$.

When combining a Pamam solution with a FeP4+ solution, the resulting solution remains clear. For the tests, a solution with a concentration of Pamam G4.5 of $2.6 \times 10^{-6}$ M, and a concentration of $2 \times 10^{-4}$ M of FeP4+ (pH 7.5 ($PO_4^{3-}$, 0.3 M), RT) was used. Sulphide was added ($12 \times Na_2S$ addition, 0.5 mM each). During the first addition of sulphide, the solution turns brown. The pH value remains constant during the course of the reaction.

In the presence of the negatively charged Pamam G4.5, the catalytic effect of the FeP4+ on the oxidation of hydrogen sulfide can be observed. Pamam G4.5 without the addition of chelate complex does not accelerate the reaction. With FeP4+, the first cycle runs very quickly. Even after several cycles, no significant decrease in oxidation rate is observed (FIG. 22). Thus, $4 \times 10^{-7}$ mol of chelate complex can oxidize at least $1.2 \times 10^{-5}$ mol of $Na_2S$ without any apparent loss in reactivity.

Immobilization on Suitably Functionalized Polymers

Oxidation of Hydrogen Sulfide with FeP4+ in the Presence of PEDOT/PSS

FIG. 23 illustrates the structure of poly-3,4-ethylenedioxythiophene (PEDOT)/polysulfonic acid (PSS), which can also be used in order to immobilize the chelate complexes used in the context of the present invention. Solutions were prepared containing 100 μl of EDOT/PPS in 1.9 ml of buffer (pH 7.5, $PO_4^{3-}$, 0.3 M) and FeP4+ with a concentration of $2 \times 10^{-4}$ M. A fir-tree green, clear solution is obtained. FIG. 25 shows the results observed upon addition of $Na_2S$ (39 times (day 1) and 17 times (day 2); 0.5 mM each at RT).

PEDOT/PSS alone results in an accelerated reaction, which becomes even faster when a chelate complex is added. After a prolonged time without addition of sulfide, a recovery of the catalyst can be observed. The $1^{st}$ cycle after a break is accelerated (cf. FIG. 26; addition after a prolonged break and transition from day 1 to day 2). A significant decrease in oxidation rate is observed only after numerous cycles. The slower cycles measured during day 2 are also faster than the reaction with PEDOT/PSS alone (FIG. 25). That is, $4 \times 10^{-7}$ mol of chelate complex oxidize at least $5.6 \times 10^{-5}$ mol of $Na_2S$.

The systems EDOT/PSS or Pamam with chelate complex are thus characterized by a low reduction in reactivity per addition of sulphide.

Figure 1:
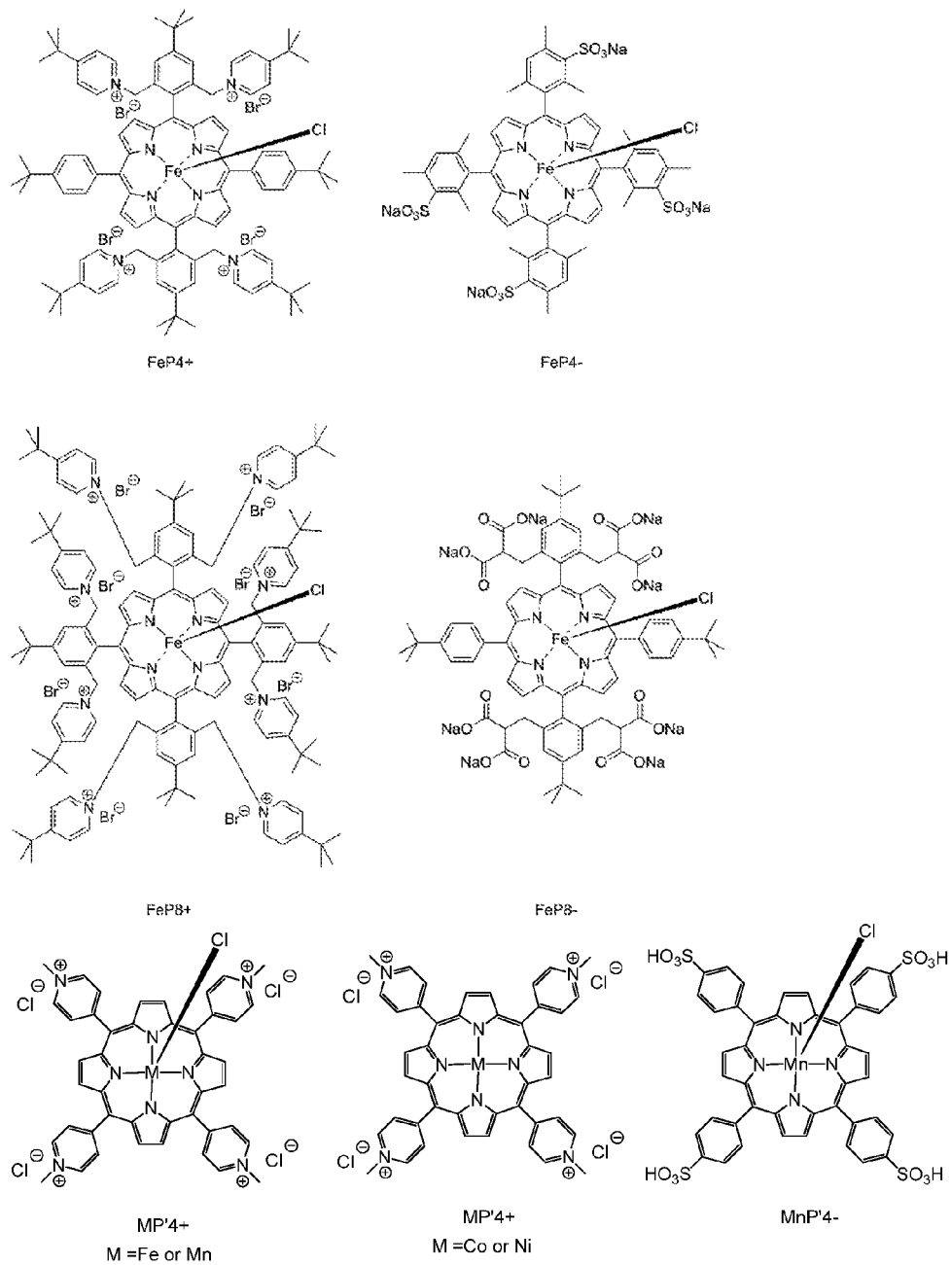
FIG. 1 illustrates chemical structures of exemplary metal chelate complexes used in the examples and comparative examples.
Figure 2A:
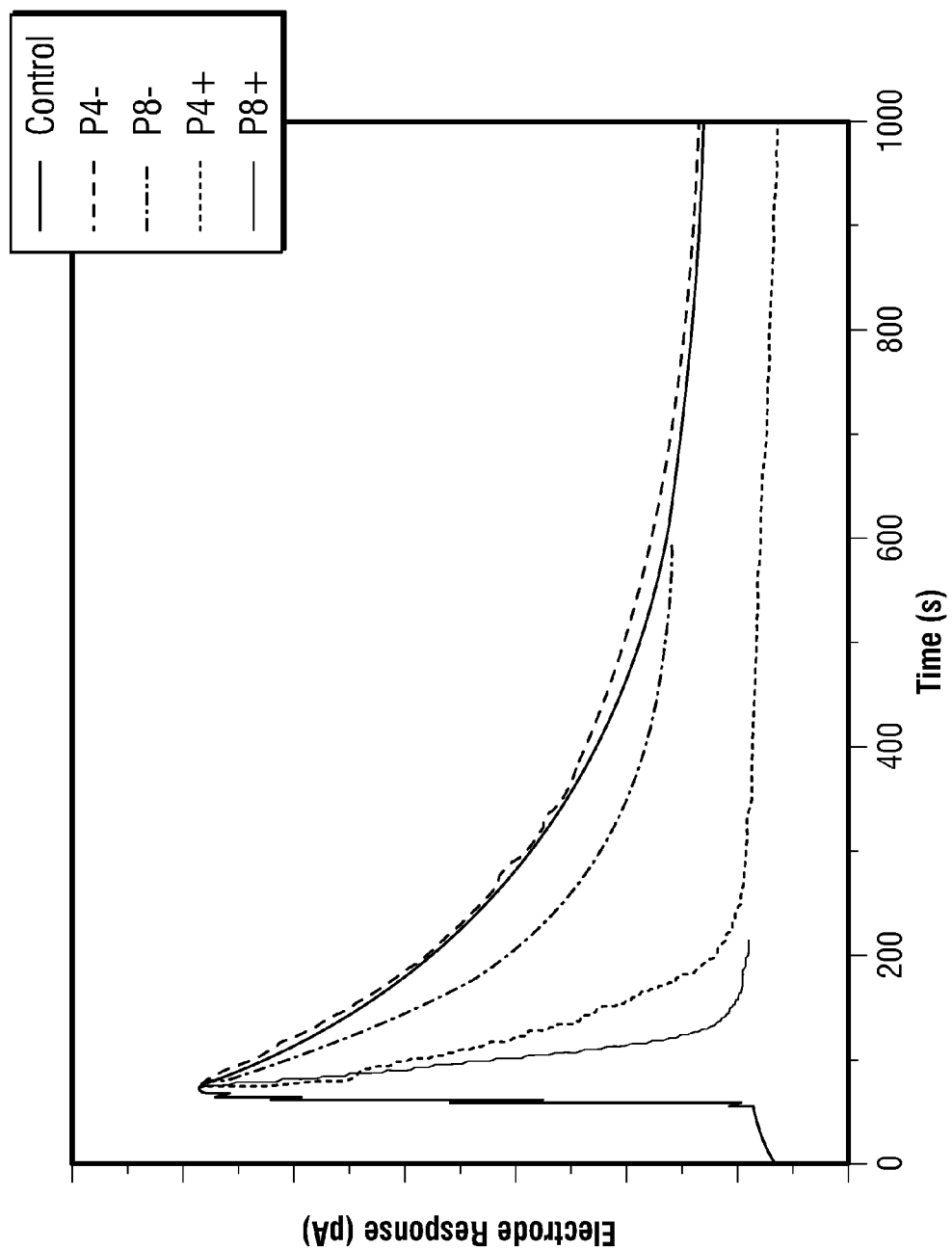
FIG. 2 demonstrates the effect of the charge on the chelate ligands on $H_2S$ removal monitored by a $H_2S$ sensitive electrode: 5 μM iron-porphyrins with 50 μM $Na_2S$ (2A) and 5 μM and 10 μM manganese complexes with 100 μM $Na_2S$ (2B) bearing different charges on the periphery removing $H_2S$ from an aqueous solution (pH=7.4) at room temperature (RT) in comparison with a control measurements in the absence of chelate complex.
Figure 2B:
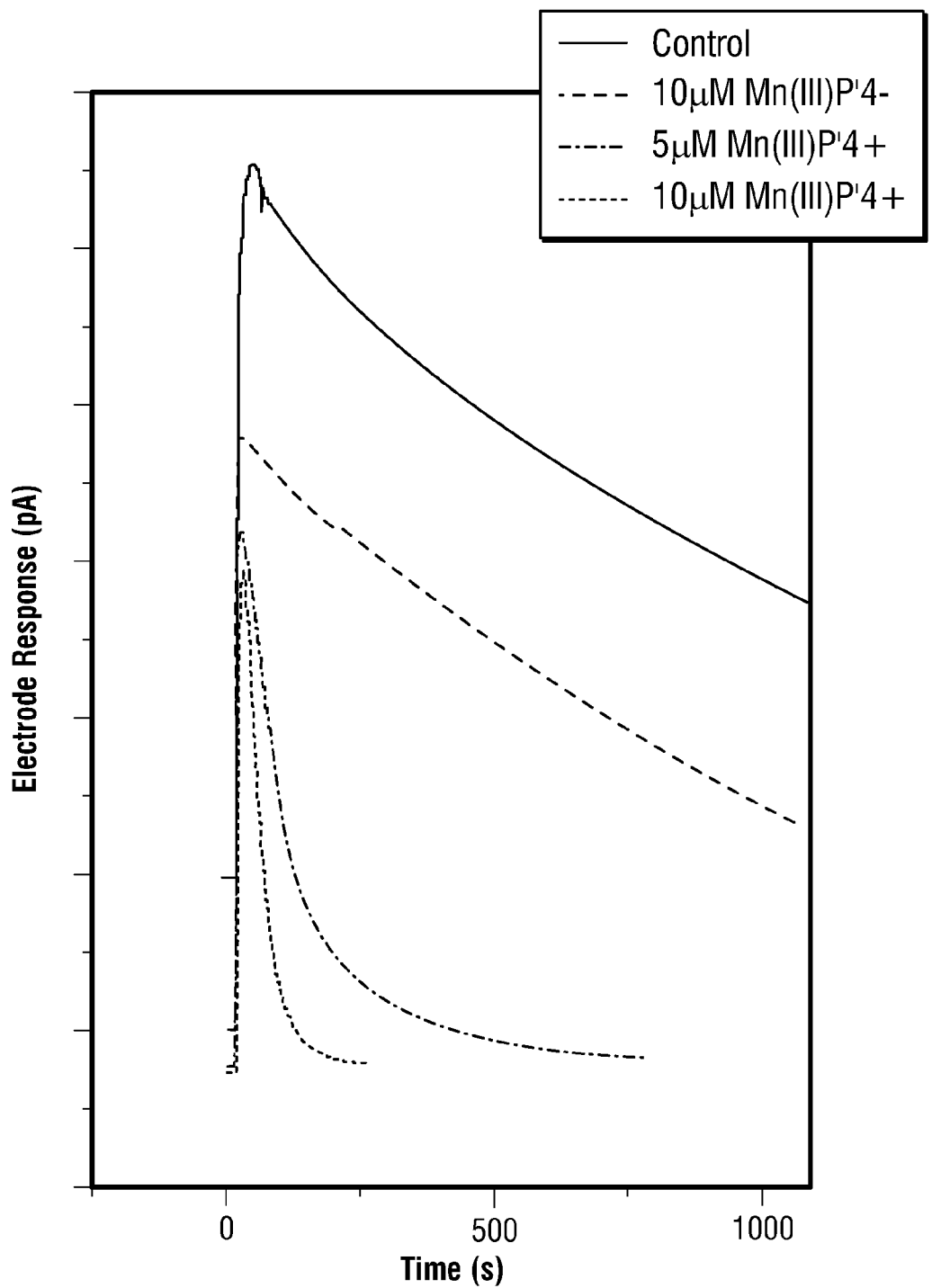
Figure 3:
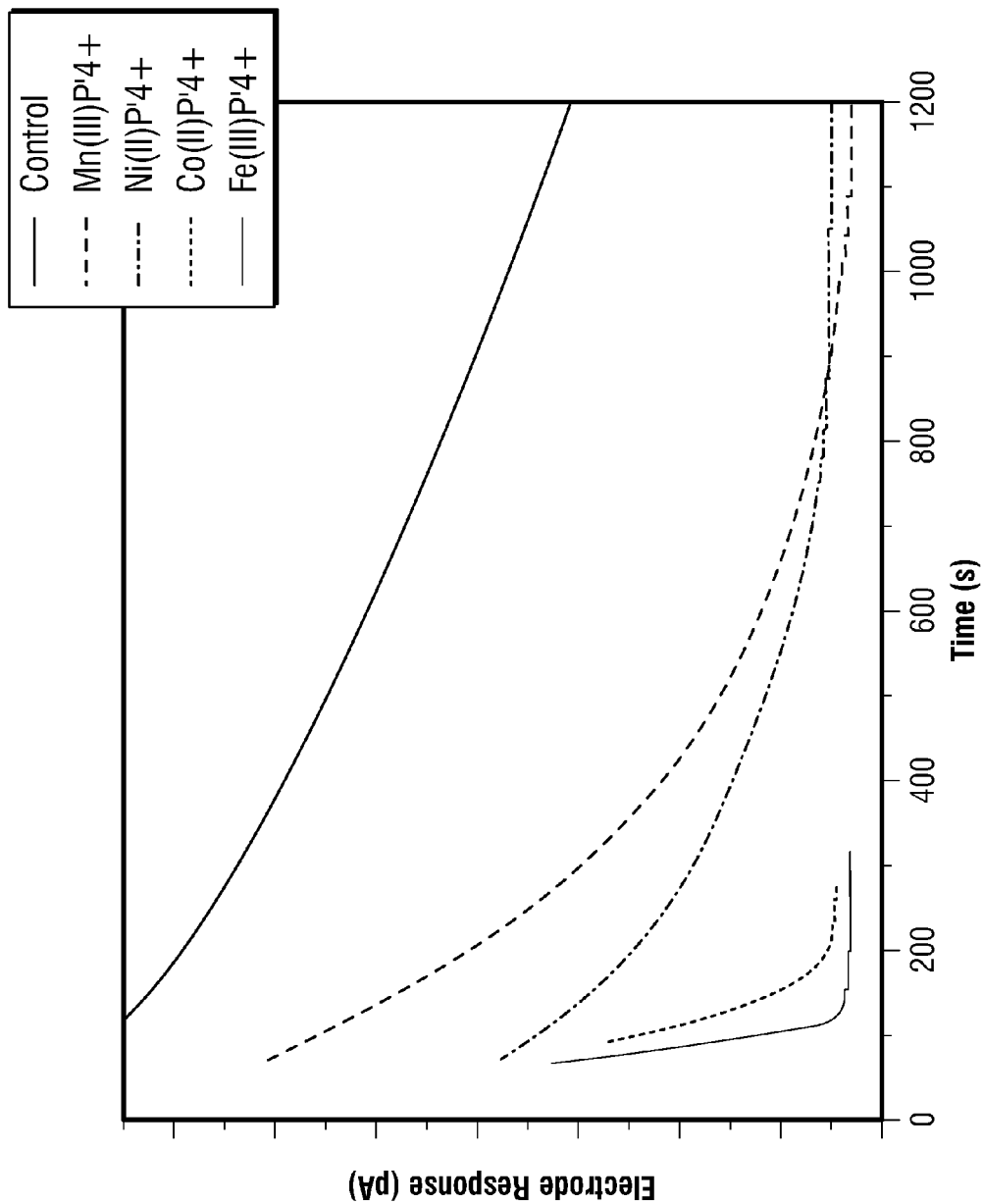
FIG. 3 shows a comparison of the catalytic activity of the four porphyrin complexes, with the same chelate ligand and different metal centres, in terms of $H_2S$ oxidation (conditions: concentration of complexes was $2.0 \times 10^{-5}$ mol/L, concentration of $Na_2S=2.0 \times 10^{-4}$ mol/L, pH=7.4 in 50 mM phosphate buffer).
Figure 4:
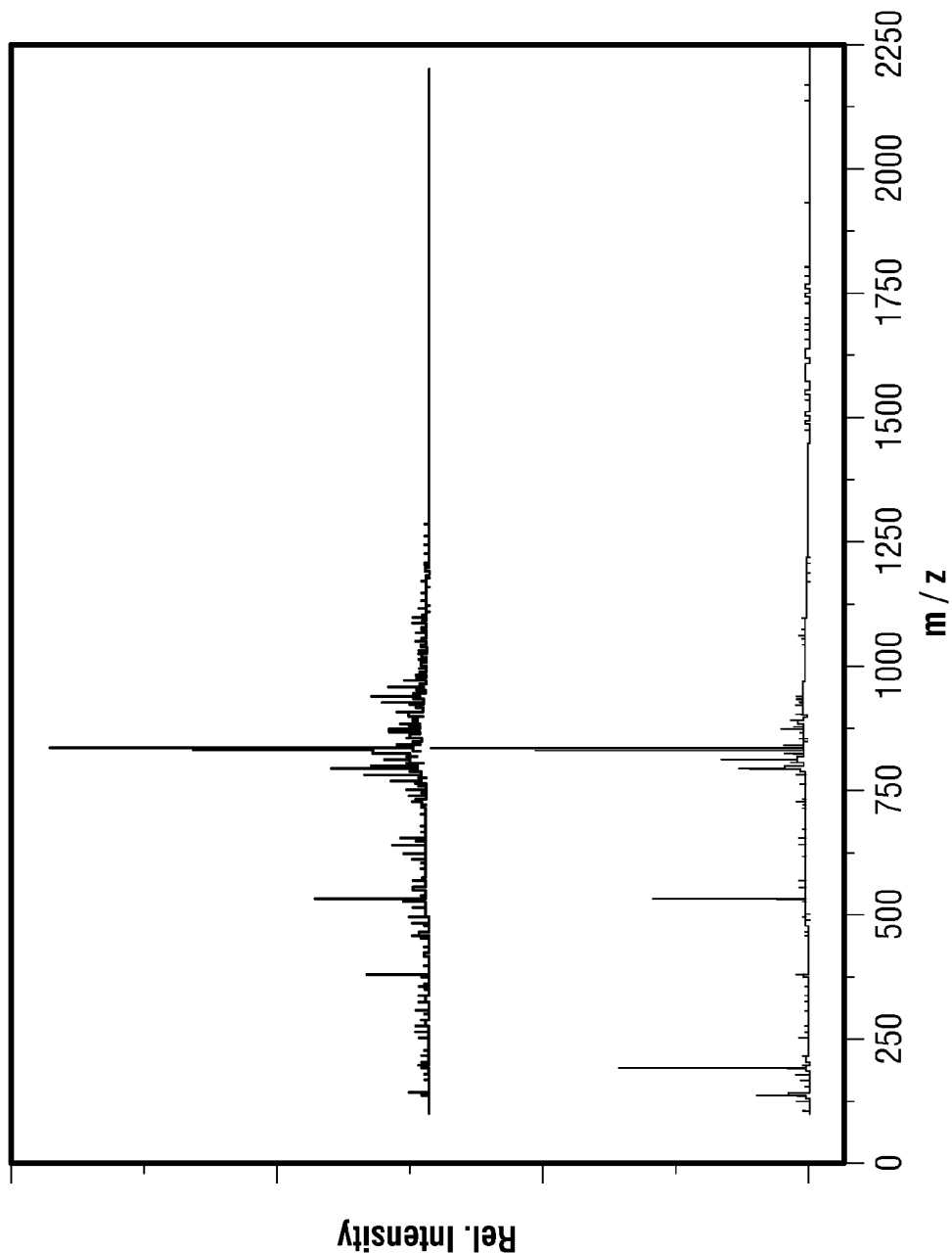
FIG. 4 shows the MS spectral analysis of the reaction mixture before (A) and after the reaction (B). Concentrations of FeP4+ and $Na_2S$ were 5 μM and 100 μM, respectively. Reaction was carried out in potassium phosphate buffer, pH 7.4.
Figure 5:
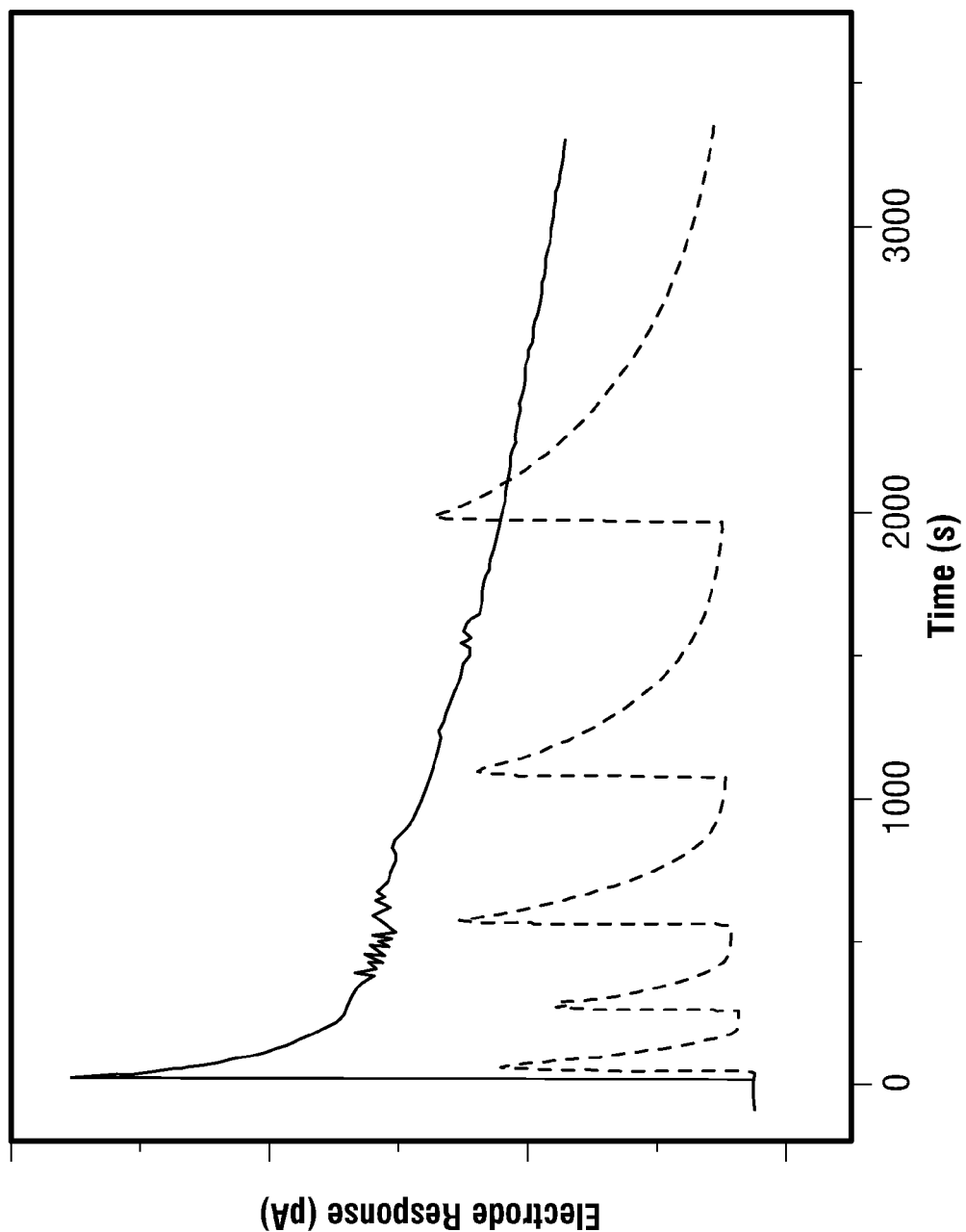
FIG. 5 illustrates the effect of subsequent bolus additions of $H_2S$ into a FeP4+ solution. Six cycles of $H_2S$ removal in a 2.5 μM FeP4+ solution (gray) and one control experiment with 100 μM $Na_2S$ (black). Each addition resulted in a 20-fold excess of hydrogen sulphide with respect to the catalyst, such that a total of 120-fold of $H_2S$ was removed.
Figure 6A:
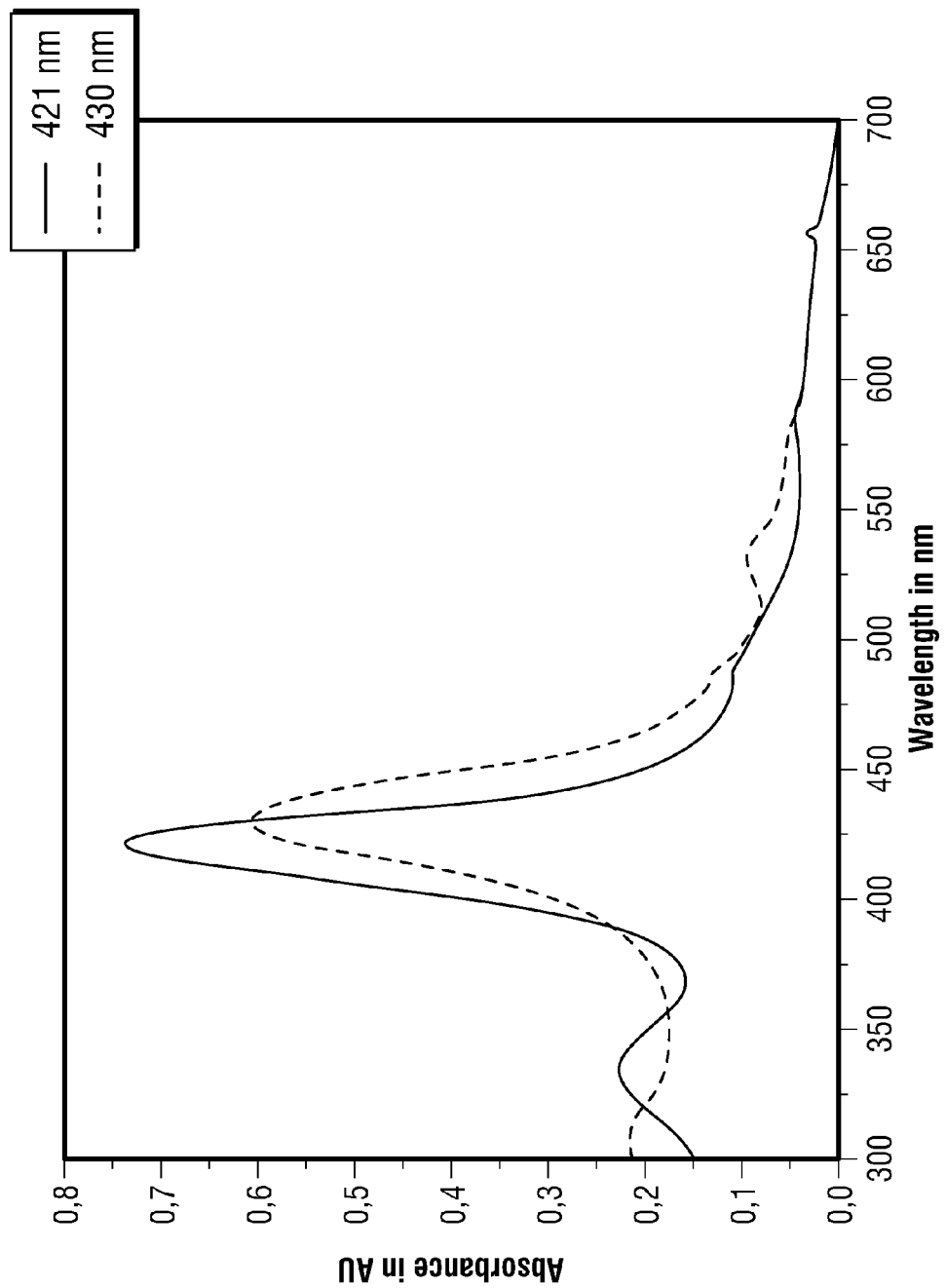
FIG. 6 shows UV-VIS spectra of $Fe^{3+}$ porphyrin complexes in reaction with $H_2S$ anaerobically (6A) and aerobically (6B).
FIG. 6C shows the reference spectrum of the starting $Fe^{3+}$ porphyrin complex, before the reaction. Concentrations of $Fe^{3+}$ porphyrin and $Na_2S$ were 5 μM and 50 μM, respectively. Reaction was performed in potassium phosphate buffer, pH 7.4.
Figure 6B:
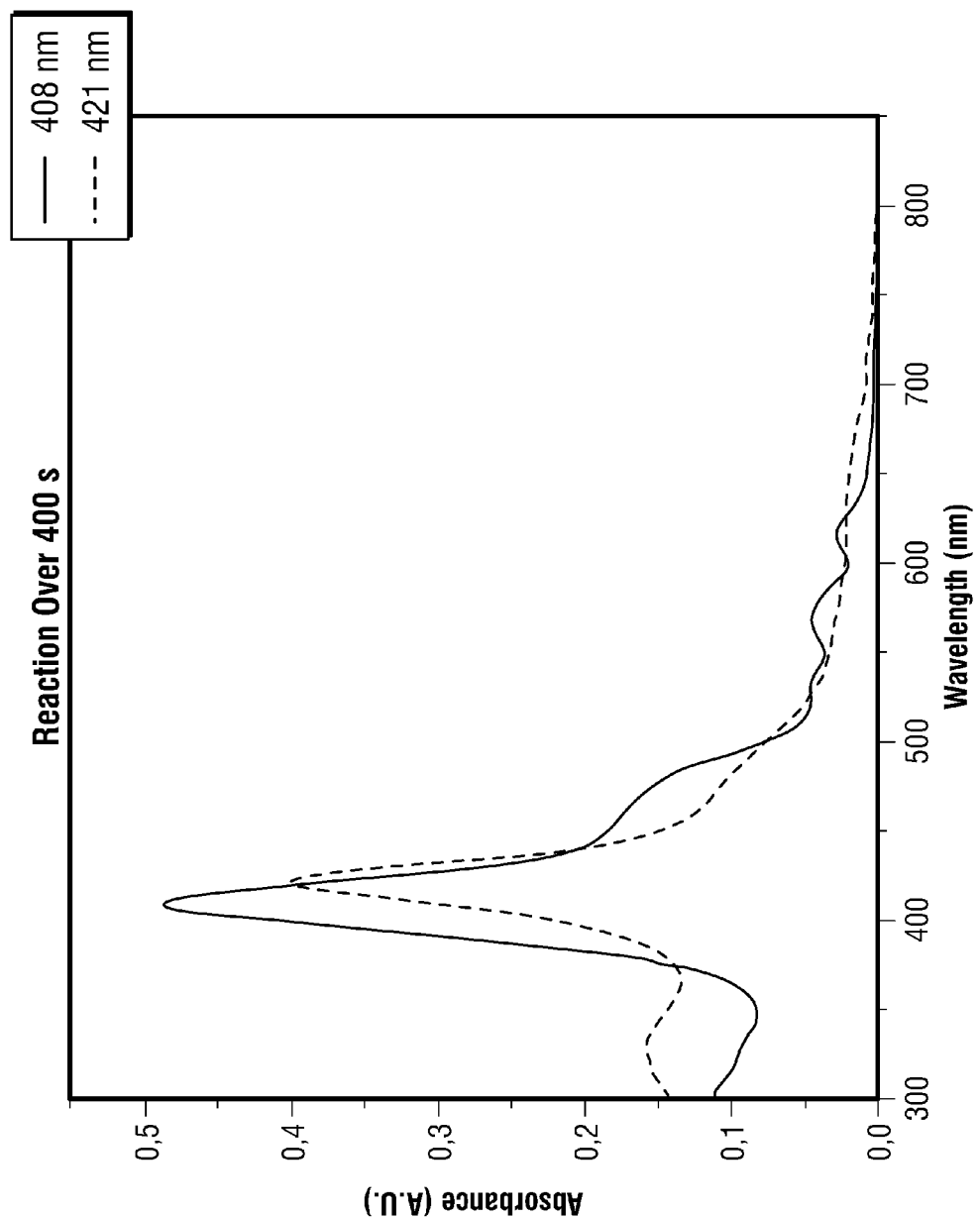
Figure 6C:
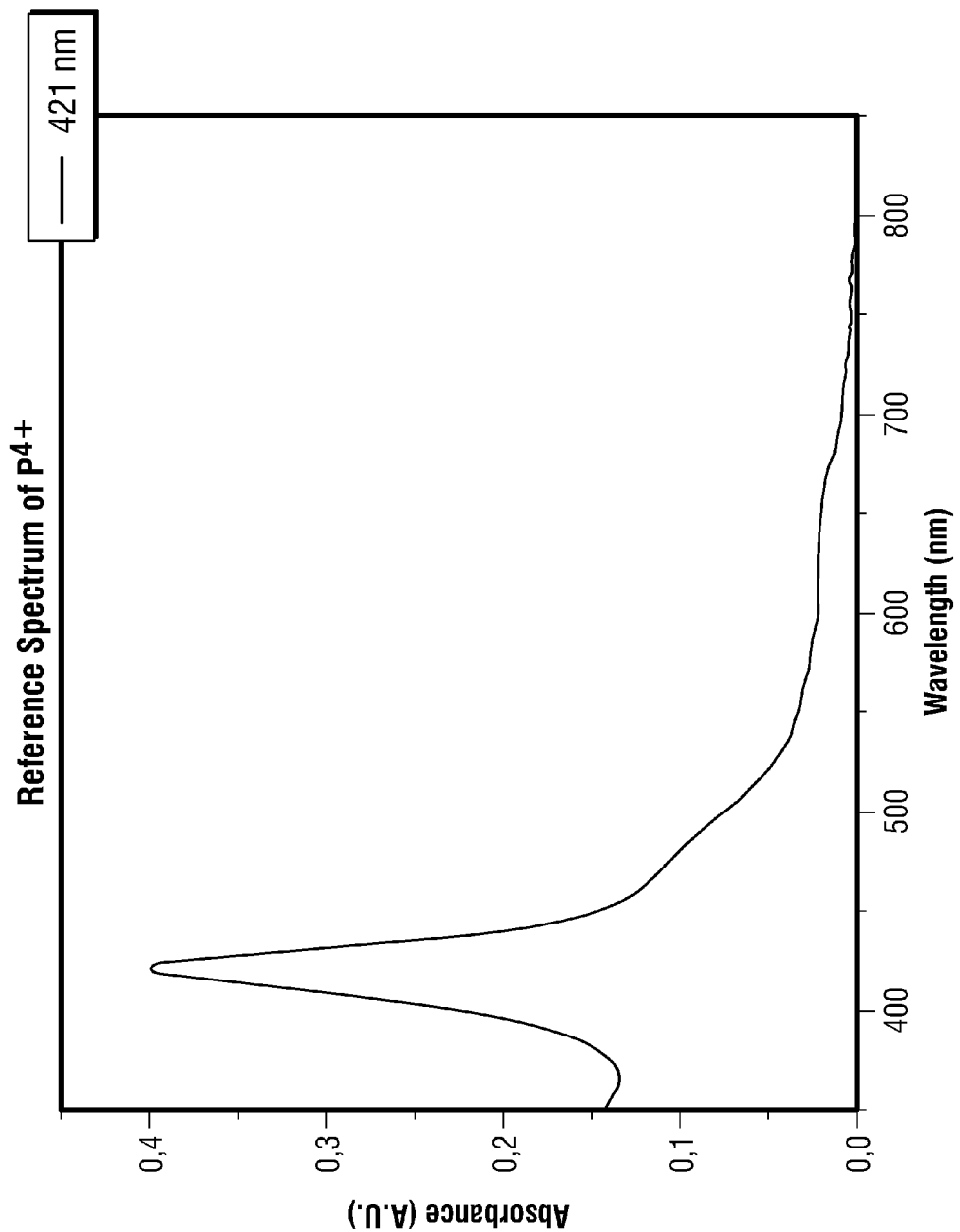
Figure 7A:
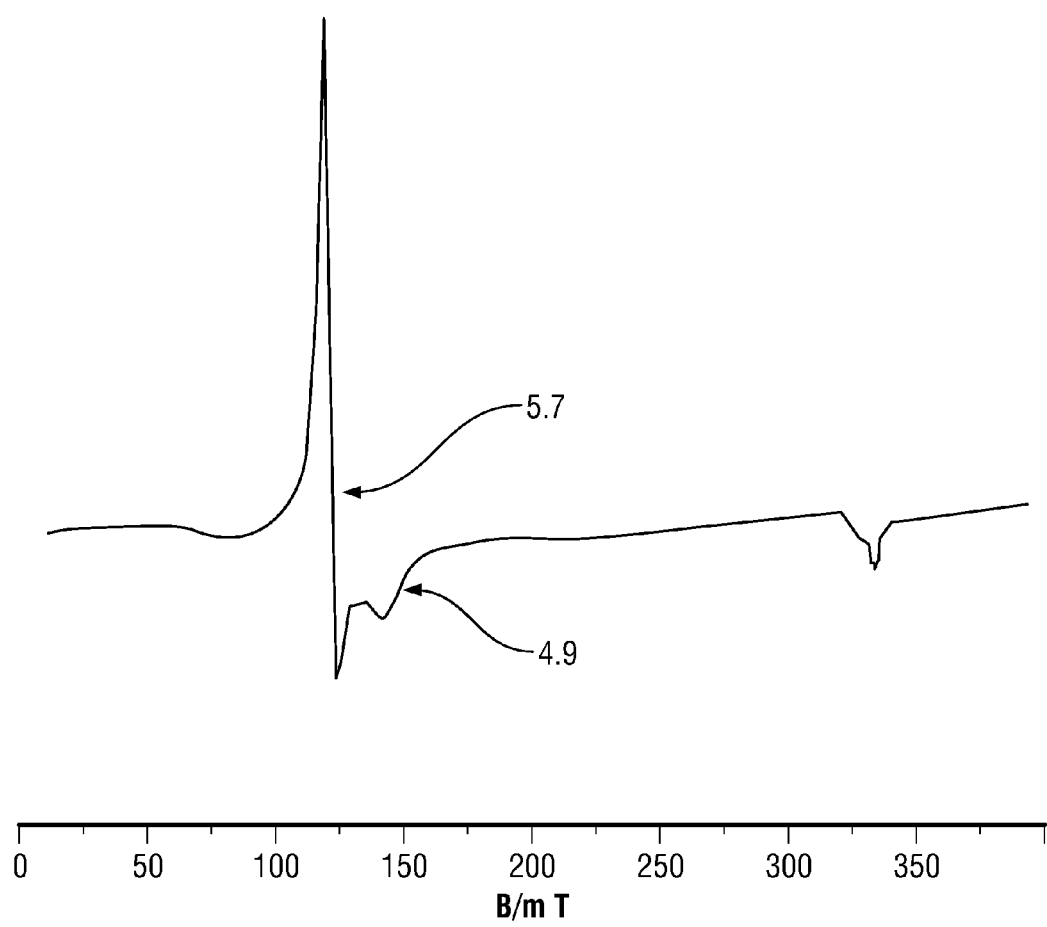
FIG. 7 shows time dependent EPR spectra of the reaction of FeP4+ and sulphide species aerobically at 16 K. 7A) Fe(III) P4+; 7B) immediately after the addition of sulphide species; 7C) spectrum after the reaction time of 1 min (black solid lines) and 5 minutes (dashed lines); 7D) magnified spectra from 250-350 mT, showing all previous described spectra.
Figure 7B:
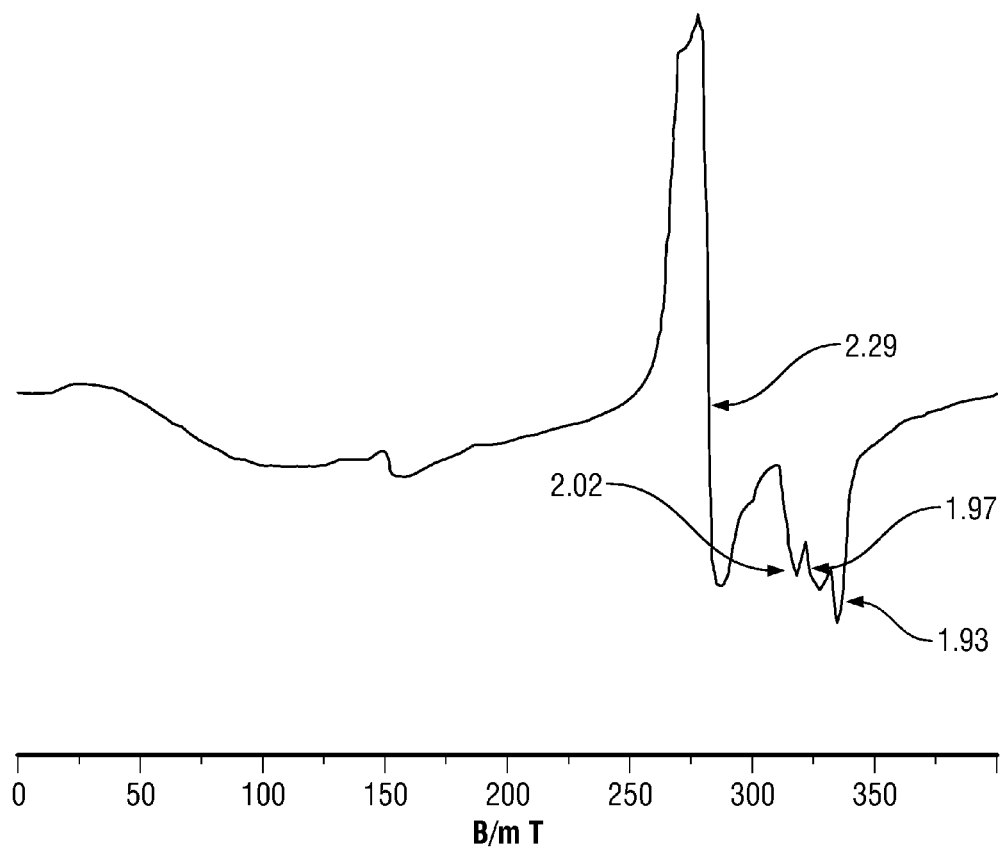
Figure 7C:
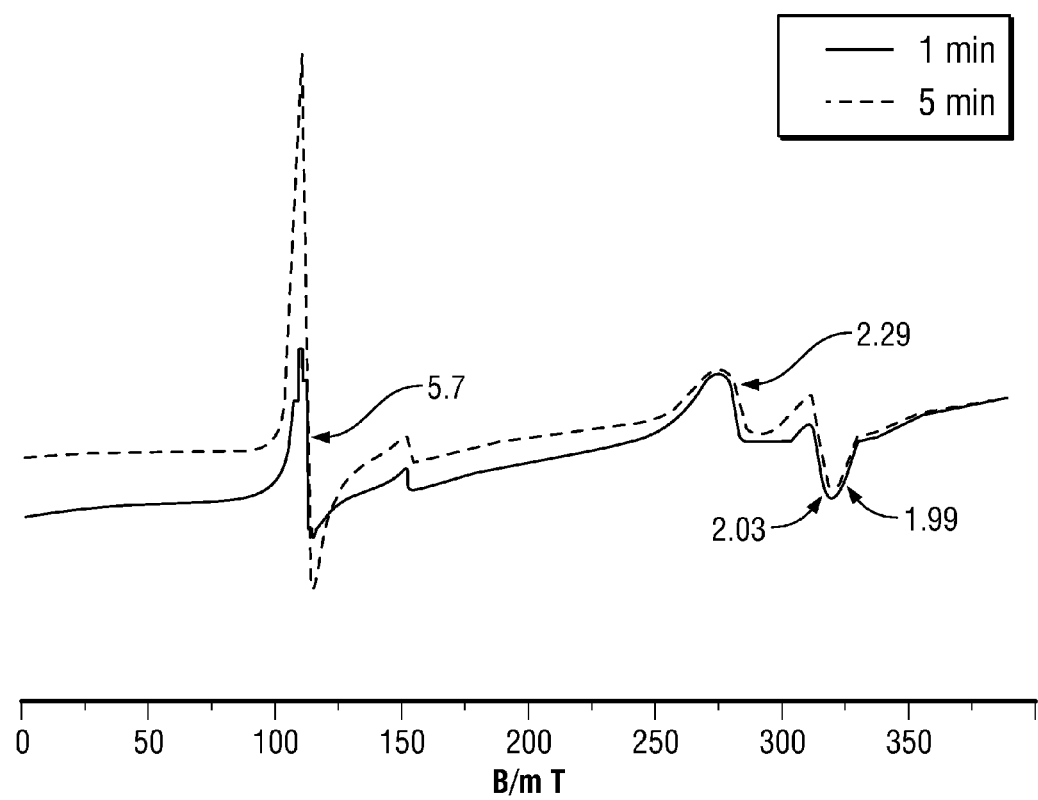
Figure 7D:
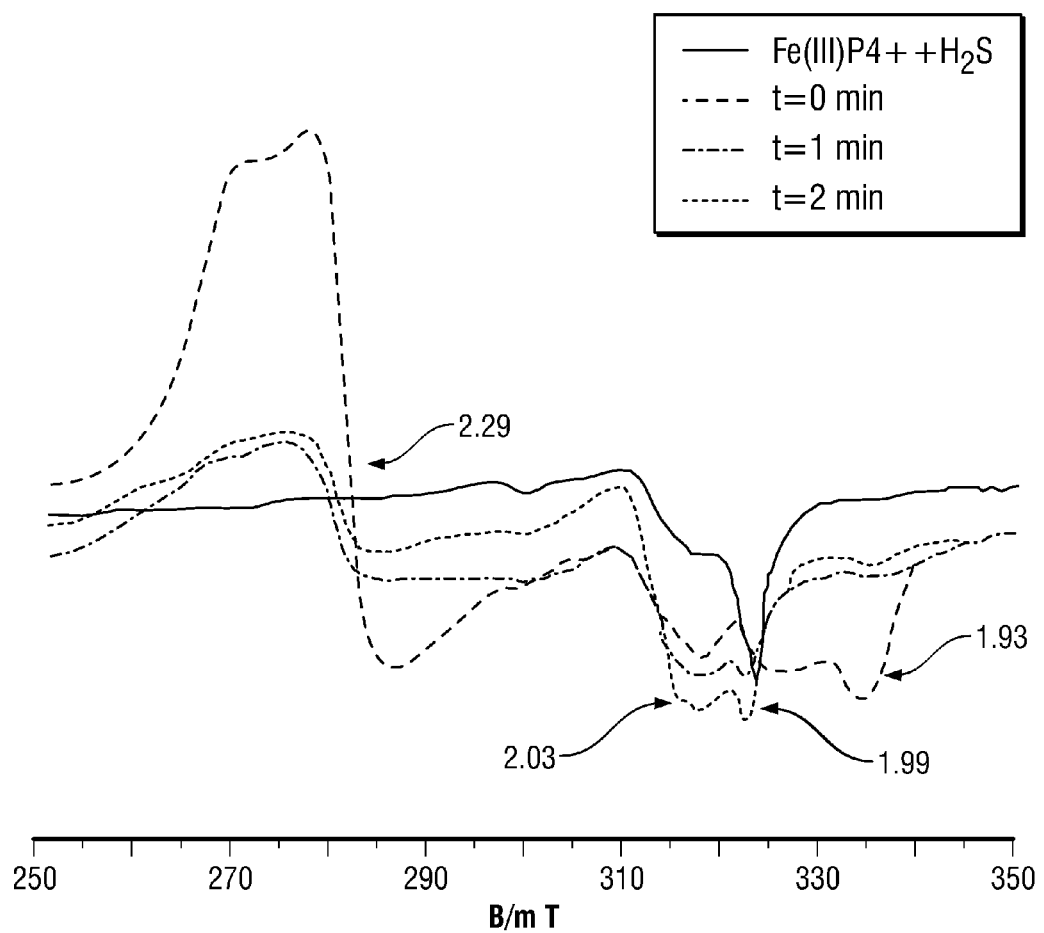
Figure 8:
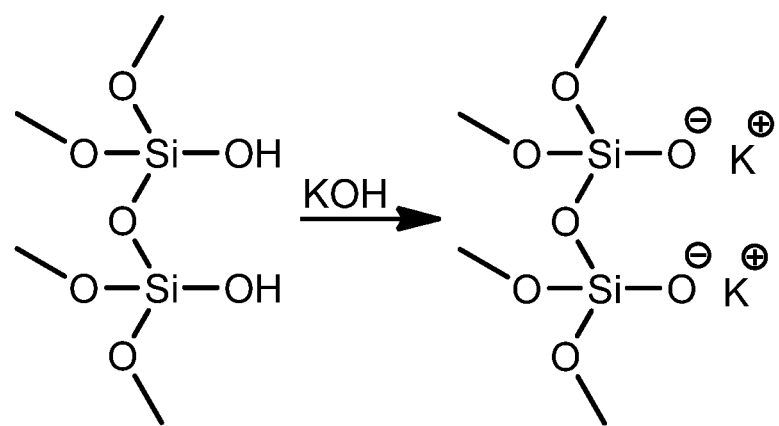
FIG. 8 shows schematically the deprotonation of a silica glass surface by etching it with a strong base.
Figure 9:
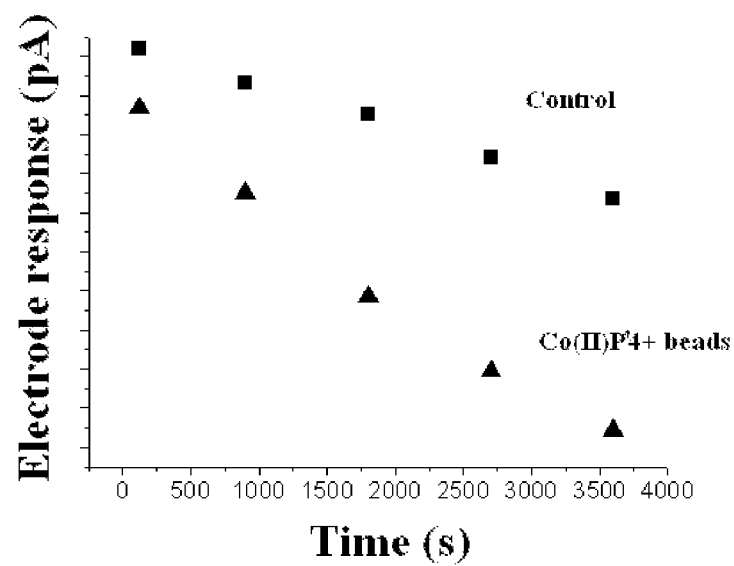
FIG. 9 provides a comparison of an uncatalyzed and a catalyzed (with cobalt complex CoP'4+ coated glass beads) $H_2S$ oxidation.
Figure 10:
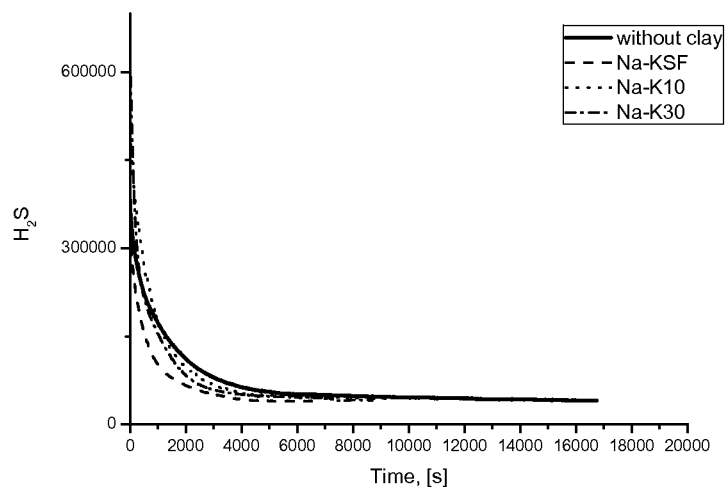
FIG. 10 shows the results obtained for the oxidation of $H_2S$ (pH 7.5 (0.3 M phosphate buffer), $Na_2S$ 0.5 mM, RT) in the absence and in the presence of unloaded clay.
Figure 11:
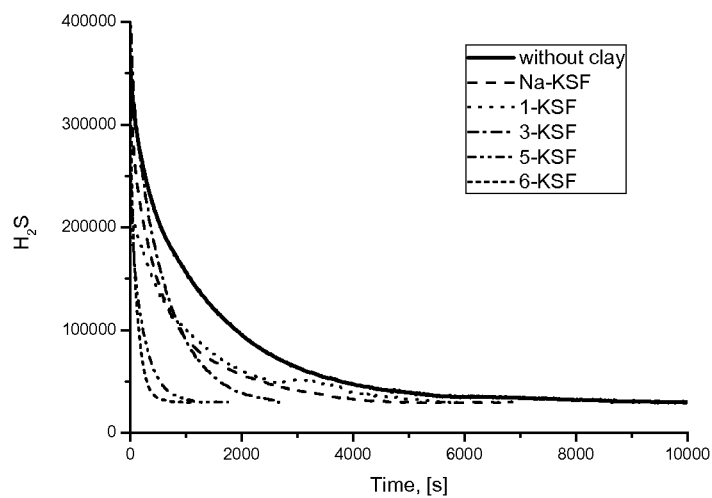
FIG. 11 shows the results obtained for the oxidation of $H_2S$ in the presence of clay loaded with a chelate complex (16 mg of KSF-FeP4+, pH 7.5 (0.3 M of phosphate buffer), $Na_2S$ 0.5 mM, RT, 1st addition of sulphide).
Figure 12:
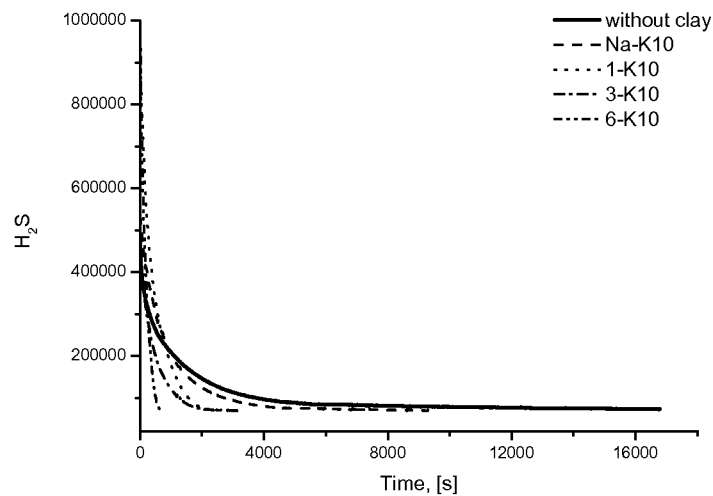
FIG. 12 shows the results obtained for the oxidation of $H_2S$ in the presence of clay loaded with a chelate complex (16 mg of K10-FeP4+, pH 7.5 (0.3 M of phosphate buffer), $Na_2S$ 0.5 mM, RT, 1st addition of sulphide).
Figure 13:
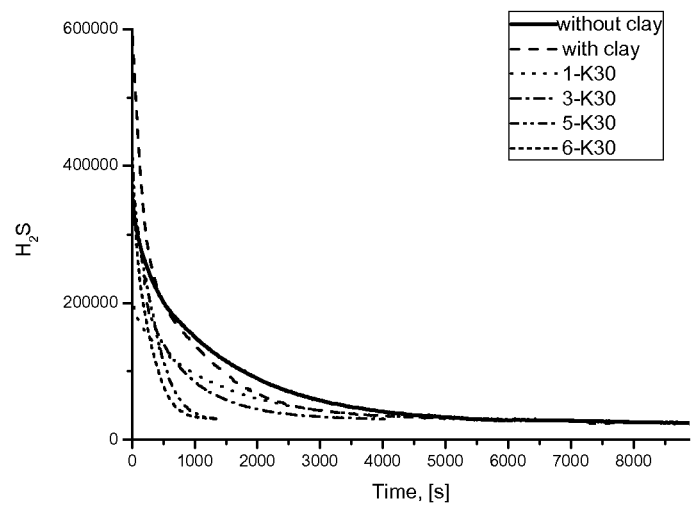
FIG. 13 shows the results obtained for the oxidation of $H_2S$ in the presence of clay loaded with a chelate complex (16 mg of K30-FeP4+, pH 7.5 (0.3 M of phosphate buffer), $Na_2S$ 0.5 mM, RT, 1st addition of sulphide).
Figure 14:
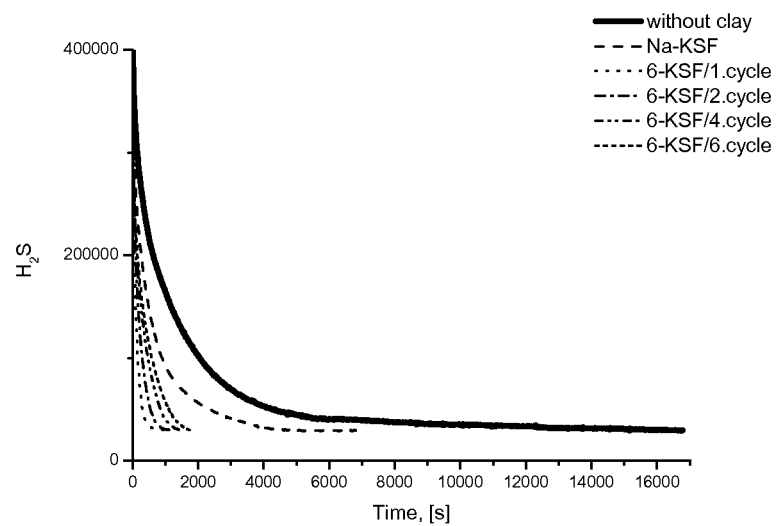
FIG. 14 shows the development of the catalytic activity of a clay loaded with a chelate complex (16 mg of 6-KSF, pH 7.5 (0.3 M of phosphate buffer), $Na_2S$ 0.5 mM, RT, 6 additions of sulphide).
Figure 15:
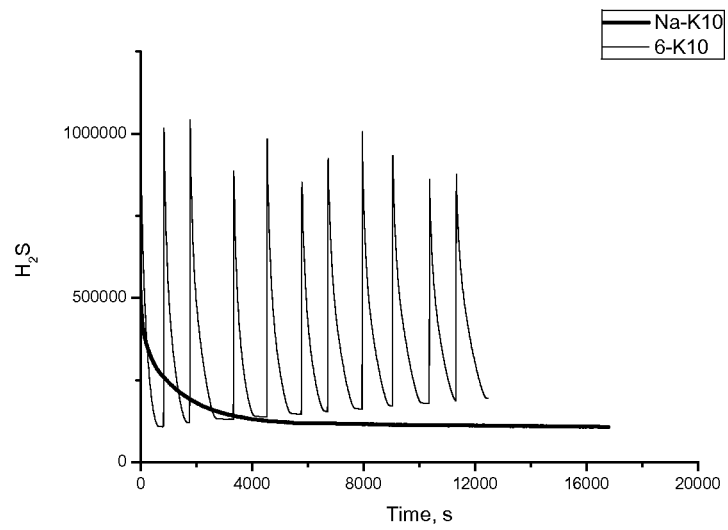
FIG. 15 shows the development of the catalytic activity of a clay loaded with a chelate complex (16 mg of 6-K10, pH 7.5 (0.3 M of phosphate buffer), $Na_2S$ 0.5 mM, RT, 11 additions of sulphide).
Figure 16:
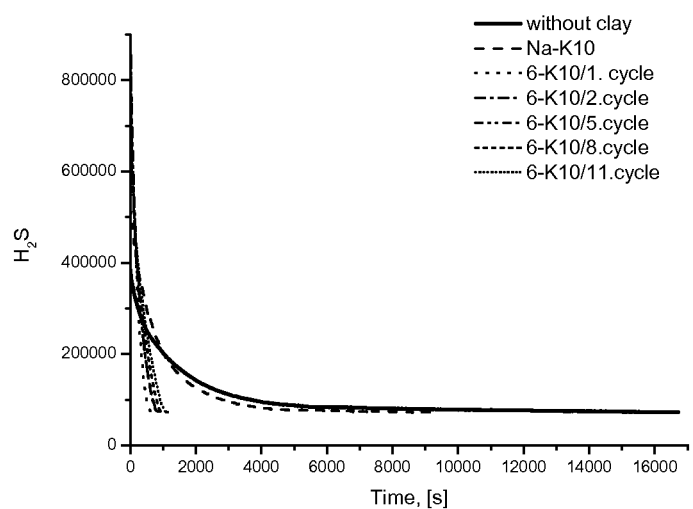
FIG. 16 shows the development of the catalytic activity of a clay loaded with a chelate complex (16 mg of 6-K10, pH 7.5 (0.3 M of phosphate buffer), $Na_2S$ 0.5 mM, RT, 11 additions of sulphide).
Figure 17:
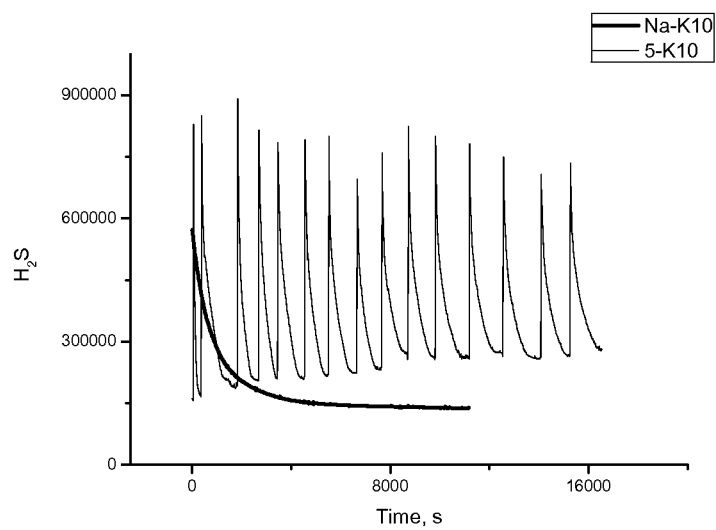
FIG. 17 shows the development of the catalytic activity of a clay loaded with a chelate complex (16 mg of 5-K10, pH 7.5 (0.3 M of phosphate buffer), 17×0.5 mM of $Na_2S$, RT).
Figure 18:
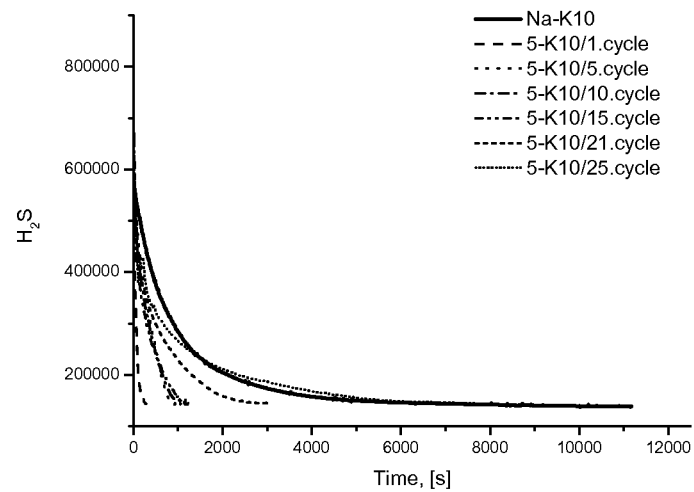
FIG. 18 shows the development of the catalytic activity of a clay loaded with a chelate complex (16 mg of 5-K10, pH 7.5 (0.3 M of phosphate buffer), $Na_2S$ 0.5 mM, RT).
Figure 19:
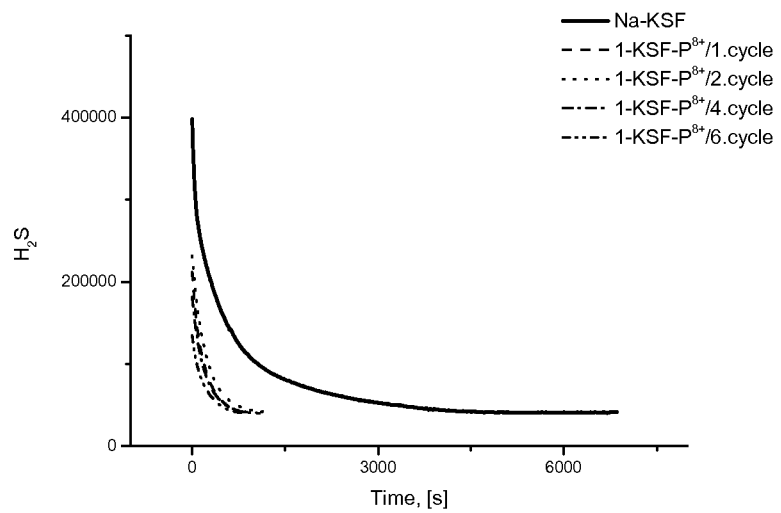
FIG. 19 shows the development of the catalytic activity of a clay loaded with a chelate complex (16 mg of 1-KSF—P8+, pH 7.5 ($PO_4^{3-}$, 0.3 M), 6×0.5 mM of $Na_2S$, RT)
Figure 20A:
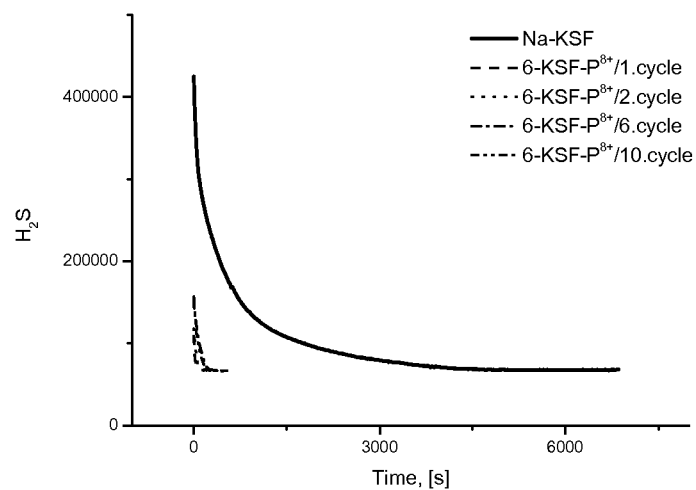
FIG. 20 shows the development of the catalytic activity of a clay loaded with a chelate complex (16 mg of 6-KSF—P8+, pH 7.5 ($PO_4^{3-}$, 0.3 M), 10×0.5 mM of $Na_2S$, RT).
FIG. 20B shows an enlarged version of the graphs obtained for the loaded clay in FIG. 20A.
Figure 20B:
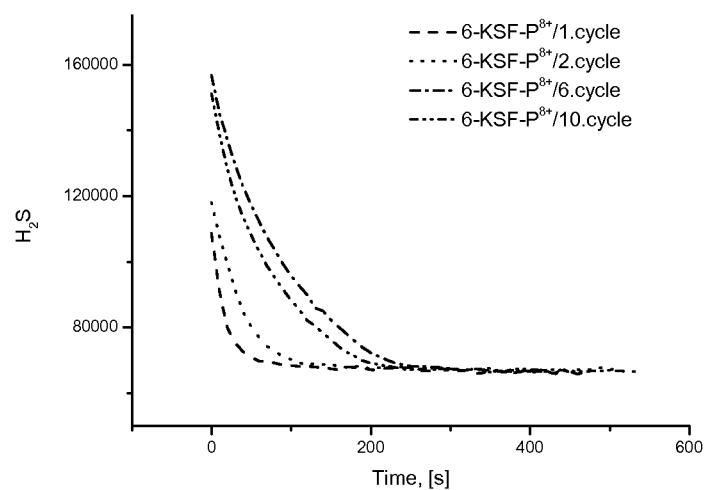
Figure 21:
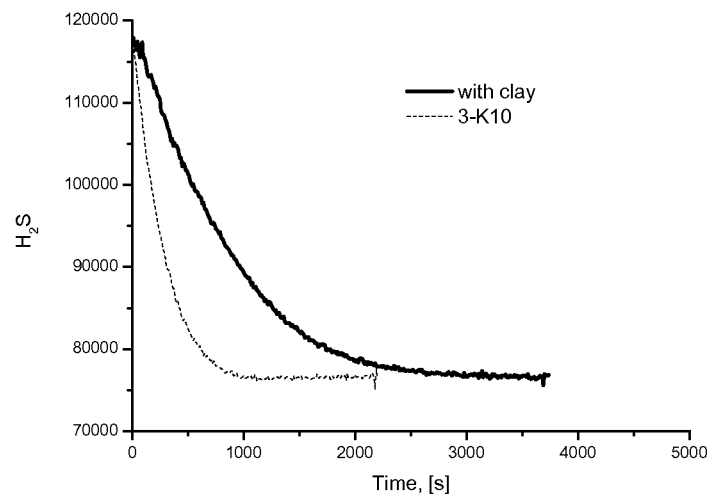
FIG. 21 shows the oxidation of sulphide in a biogas solution (16 mg of 3-K10, pH 7.5 (0.3 M of phosphate buffer), biogas solution (unknown concentration), RT)
Figure 22:
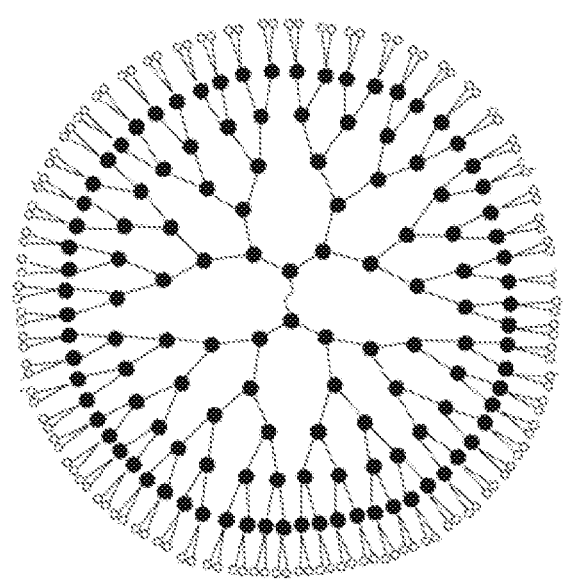
FIG. 22 schematically shows the structure of poly(amido amine) (PAMAM) G4.5, with the filled circles representing groups —$N(CH_2CH_2C(O)NHCH_2CH_2)_2$ and the open circles representing a group —$C(O)O^-$.
Figure 23:
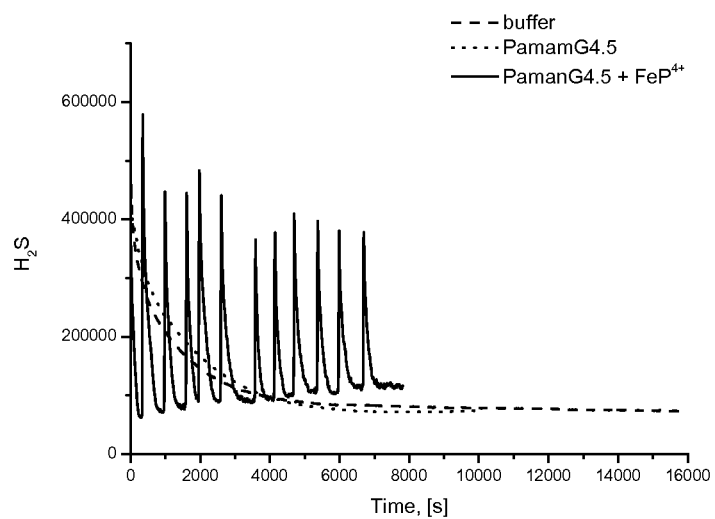
FIG. 23 shows the results obtained for the oxidation of $H_2S$ in the presence of a dendrimer structure loaded with a chelate complex ([Pamam G4.5]=2.6×$10^{-6}$ M, [FeP4+]=2×$10^{-4}$ M, 12×$Na_2S$ addition (0.5 mM each), pH 7.5 ($PO_4^{3-}$, 0.3 M), RT).
Figure 24:
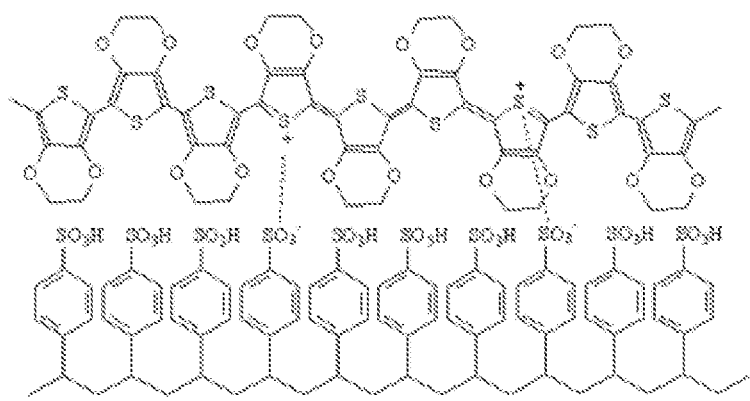
FIG. 24 illustrates the structure of poly-3,4-ethylenedioxythiophene/polysulfonic acid (PEDOT/PSS)
Figure 25:
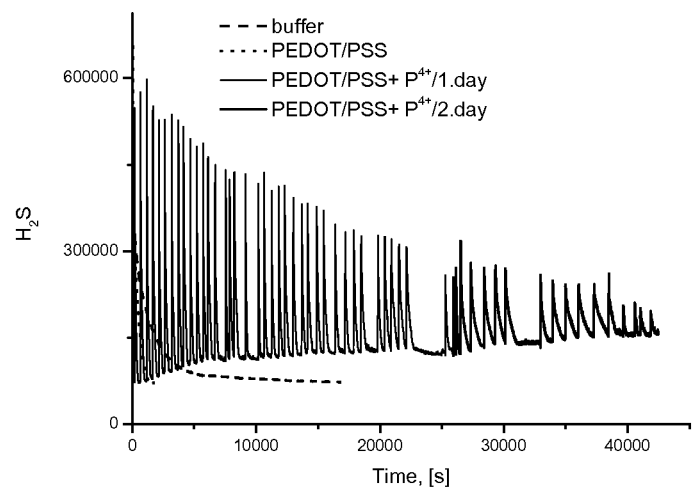
FIG. 25 shows the results obtained for the oxidation of $H_2S$ in the presence of PEDOT/PSS and a chelate complex (PEDOT/PSS, [FeP4+]=2×$10^{-4}$ M, 39 (day 1)+17 (day 2) $Na_2S$ additions (0.5 mM each), pH 7.5 ($PO_4^{3-}$, 0.3 M), RT).
Figure 26:
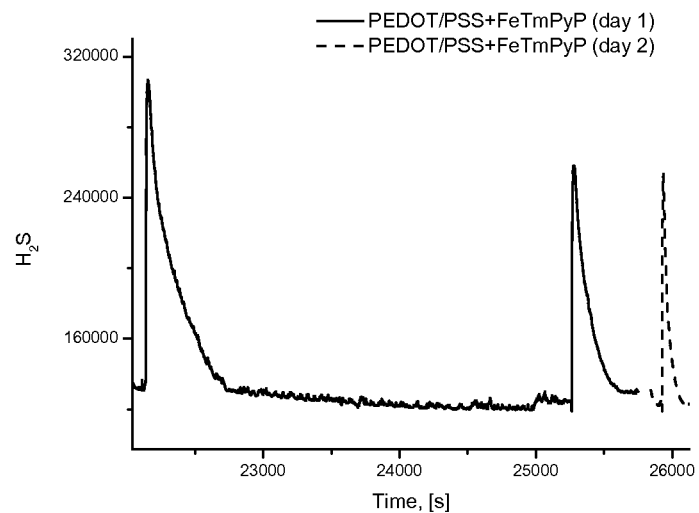
FIG. 26 shows the recovery of the catalyst observed for the oxidation of $H_2S$ in the presence of PEDOT/PSS and a chelate complex (PEDOT/PSS, [FeP4+]=2×$10^{-4}$ M.

The invention claimed is:

1. Process for the catalytic oxidation of sulphide, mono- and/or dihydrogen sulphide, comprising
    the step of contacting the sulphide, mono- and/or dihydrogen sulphide in the presence of oxygen with a chelate complex comprising
    (i) a metal cation selected from the group consisting of $Fe^{z+}$, $Mn^{z+}$, $Ni^{z+}$ and $Co^{z+}$, where z=2 or 3, and
    (ii) a chelate ligand containing a porphyrin, a phthalocyanine or a porphyrazine ring coordinated to the metal cation, and at least one cationic substituent covalently attached to the ring in the chelate ligand.

2. Process according to claim 1, wherein the chelate ligand contains at least two cationic substituents.

3. Process according to claim 1, wherein the metal cation is $Fe^{3+}$.

4. Process according to claim 1, wherein the chelate ligand contains a porphyrin ring.

5. Process according to claim 1, wherein the sulphide, mono- and/or dihydrogen sulphide is contacted with the chelate complex in the presence of air.

6. Process according to claim 1, wherein the chelate complex comprises a structure represented by formula (6), formula (7) or formula (8):

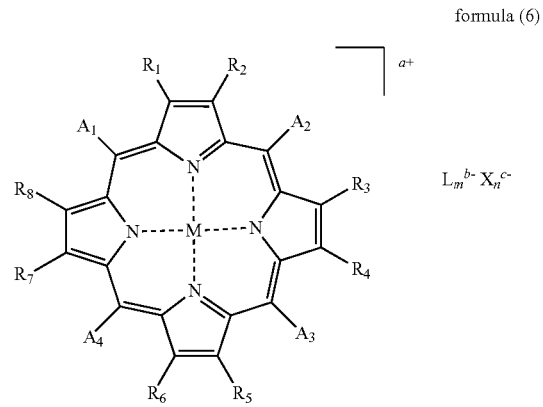

formula (6)

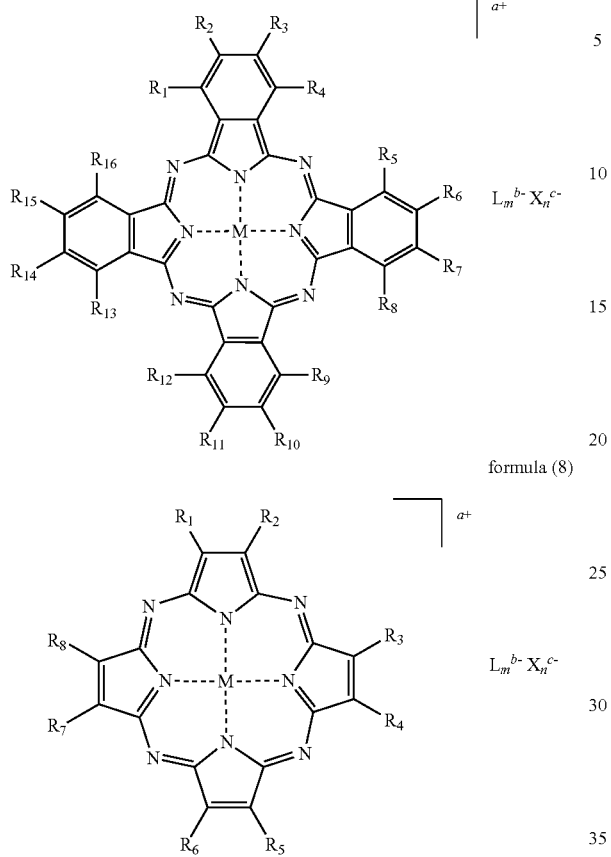

wherein M is a metal cation selected from $Fe^{z+}$, $Mn^{z+}$, $Ni^{z+}$ and $Co^{z+}$ where z=2 or 3, a+ represents the sum of charges which are provided by the chelate ligand and the metal cation; L is an anionic or neutral ligand coordinated to M; m is 0, 1 or 2; b is, independently for each L in the case of m being 2, 0 or 1; X is an anionic counterion, and c and n are selected such that the sum of negative charges provided by the counterion(s) X balances any positive charge, which results from the sum of charges of the metal cation and its coordinated ligands; substituents $A_1$ to $A_4$ and $R_1$ to $R_{16}$ are independently selected from (i) H, halogen, —CN, —OH, —$NH_2$, —$N_3$, —$PH_2$, —$NO_2$, —$SO_2NH_2$, or a hydrocarbon group which may contain one or more heteroatoms, (ii) or from a cationic substituent comprising an ammonium, phosphinium or pyridinium group; and wherein any pair of two of the substituents in appropriate position may be combined to form a cyclic structure together with the carbon atoms to which they are attached, with the proviso that the chelate ligand in the chelate complex of formulae (6), (7) and (8) contains at least one cationic substituent.

7. Process according to claim 1, wherein the cationic substituent comprises a cationic group which is covalently bound to the porphyrin, phthalocyanine or porphyrazine ring via a hydrocarbon linking group.

8. Process according to claim 1, wherein the cationic substituent comprises an ammonium and/or a pyridinium group.

9. Process according to claim 1, wherein the chelate complex is immobilized on a support.

10. Process for the removal of sulphide, mono- and/or dihydrogen sulphide from a liquid or gaseous medium, comprising the oxidation of the sulphide, mono- and/or dihydrogen sulphide in accordance with the process of claim 1.

11. Process according to claim 1, wherein the chelate complex is present in a liquid medium in a concentration of 1 μM to 10 mM.

12. Process in accordance with claim 1, which is carried out in a liquid medium at a pH of 6 or below and which yields elemental sulphur as a product of the oxidation of the sulphide, mono- and/or dihydrogen sulphide.

13. Process in accordance with claim 1, which is carried out in a liquid medium at a pH of 7 or above and which yields $S_2O_3^{2-}$ as a product of the oxidation of the sulphide, mono- and/or dihydrogen sulphide.

14. Process in accordance with claim 1, which is carried out in a liquid medium at a pH between 6 and 7 and which yields a mixture of elemental sulphur and $S_2O_3^{2-}$ as products of the oxidation of the sulphide, mono- and/or dihydrogen sulphide.

* * * * *